United States Patent [19]
Hoshi

[11] Patent Number: 4,858,228
[45] Date of Patent: Aug. 15, 1989

[54] COMMUNICATION SYSTEM EMPLOYING MULTI-CONJUNCTION ARCHITECTURE

[75] Inventor: Kazunori Hoshi, Yokohama, Japan

[73] Assignee: Ricoh Company, Ltd., Tokyo, Japan

[21] Appl. No.: 155,519

[22] Filed: Feb. 12, 1988

[30] Foreign Application Priority Data

| Feb. 16, 1987 | [JP] | Japan | 62-31385 |
| Feb. 24, 1987 | [JP] | Japan | 62-39058 |
| May 25, 1987 | [JP] | Japan | 62-125810 |
| May 25, 1987 | [JP] | Japan | 62-125811 |

[51] Int. Cl.$^4$ .............................................. H04J 3/26
[52] U.S. Cl. ...................................... 370/60; 370/94
[58] Field of Search .................... 370/94, 60, 58; 340/825.79, 825.83; 455/607; 178/3

[56] References Cited

U.S. PATENT DOCUMENTS

| 4,276,643 | 7/1981 | Laprie et al. | 371/8 |
| 4,380,063 | 4/1983 | Janson et al. | 370/60 |
| 4,393,381 | 7/1983 | Seiden | 340/825.83 |
| 4,399,531 | 8/1983 | Grande et al. | 370/60 |
| 4,443,875 | 4/1984 | Blausten | 370/94 |
| 4,482,996 | 11/1984 | Wilson et al. | 370/60 |
| 4,602,364 | 7/1986 | Herman et al. | 370/60 |

Primary Examiner—Douglas W. Olms
Assistant Examiner—Min Jung Kim
Attorney, Agent, or Firm—Oblon, Fisher, Spivak, McClelland & Maier

[57] ABSTRACT

A communication system employing a multi-conjunction architecture has a supervising circuit for supervising whether or not a returning signal is received from a destination terminal device in response to a sending signal. When no returning signal is detected within a specific time after the sending signal is transmitted, a communication path used for transmitting the sending signal is isolated from rest of the communication system, or a pseudo returning signal is outputted from the supervising circuit to fix a communication path used for transmitting the sending signal and the pseudo returning signal. As a result, communication paths other than that used for transmitting the sending signal may be used for other communications when the returning signal is not detected for the specific time.

23 Claims, 18 Drawing Sheets

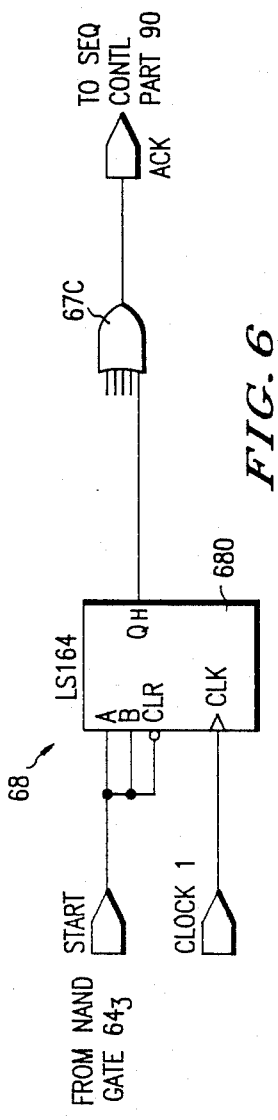
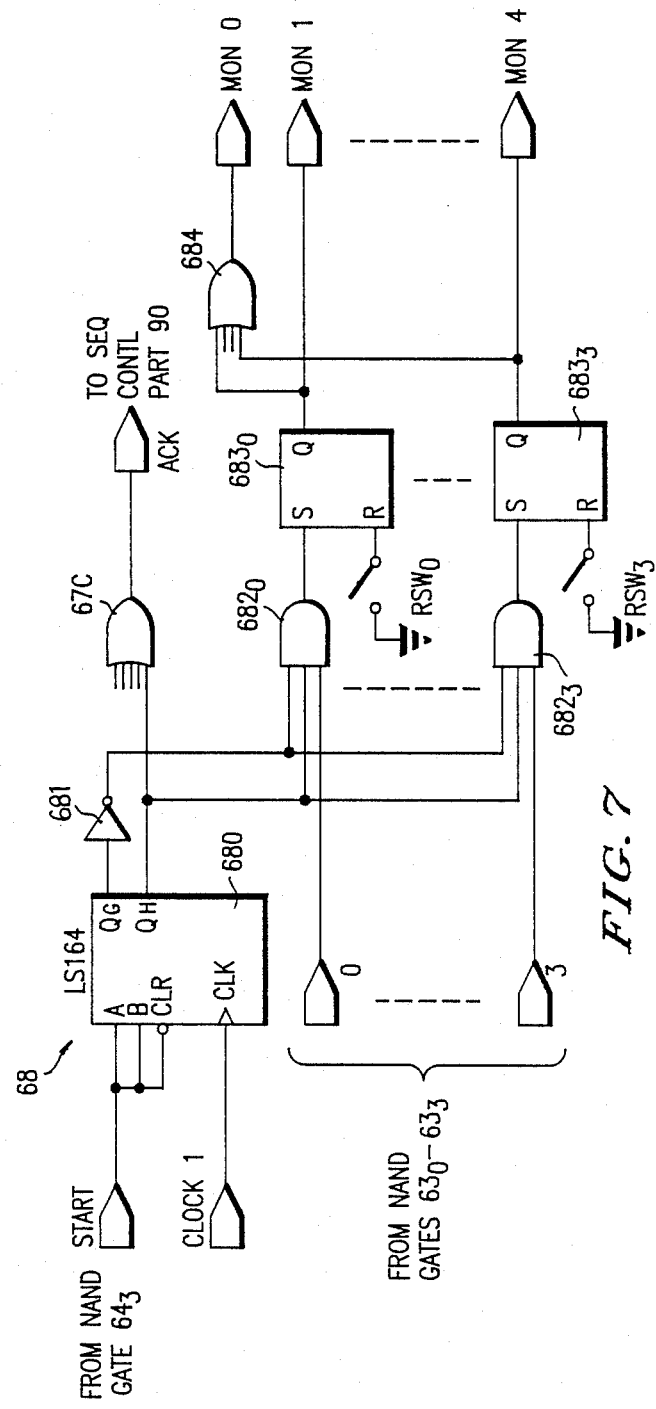
FIG. 6
FIG. 7

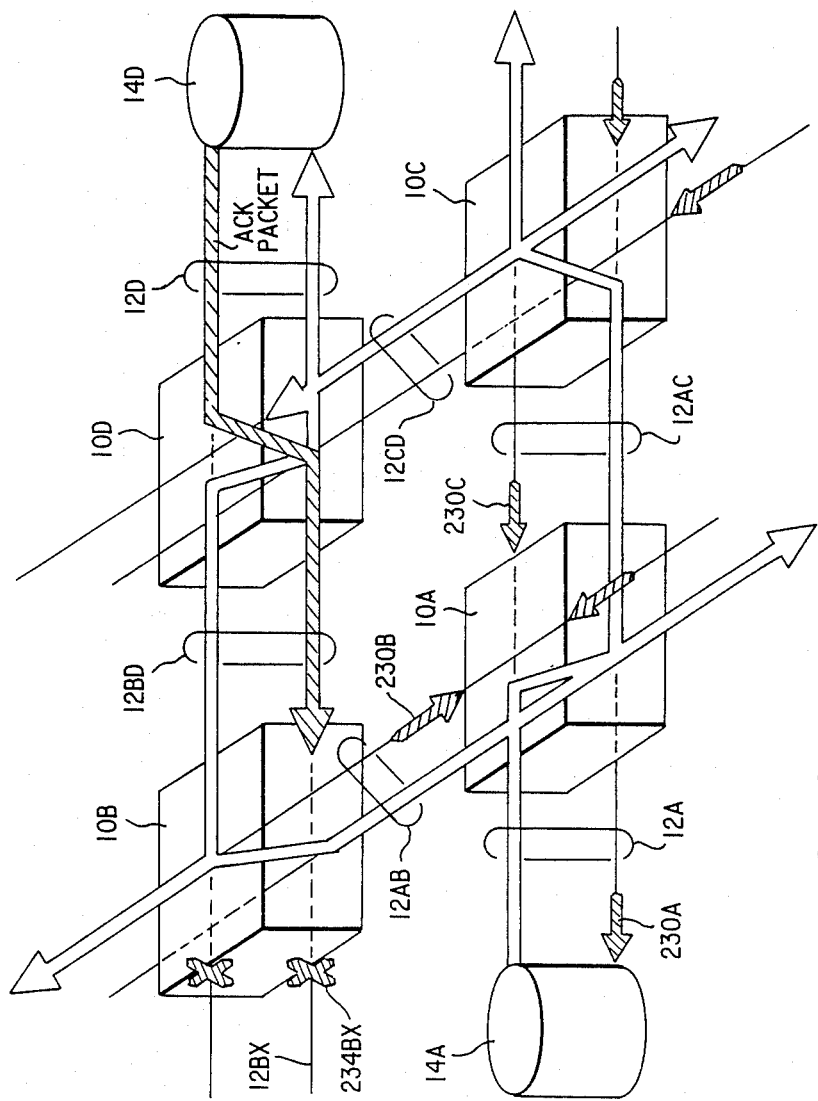

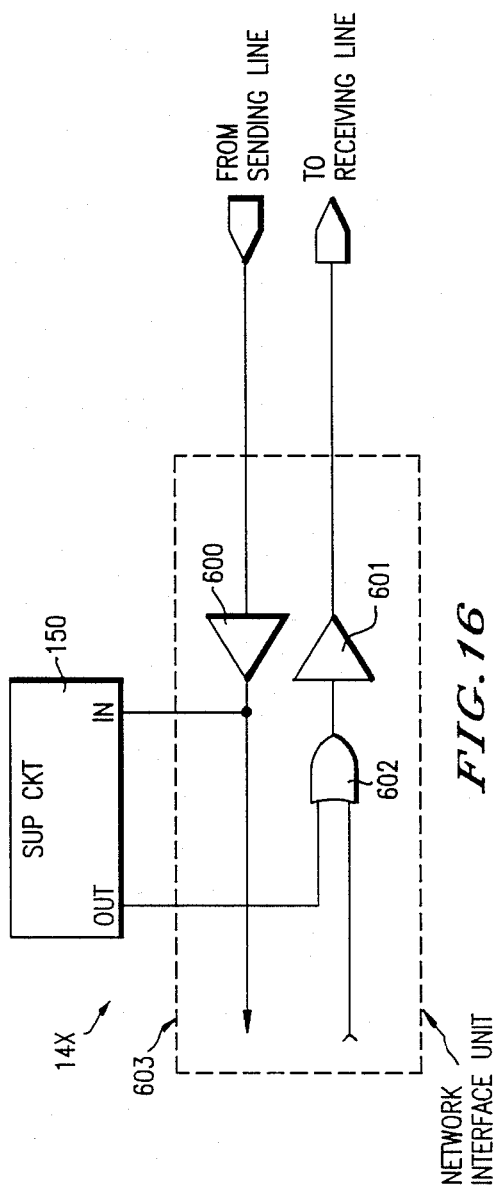
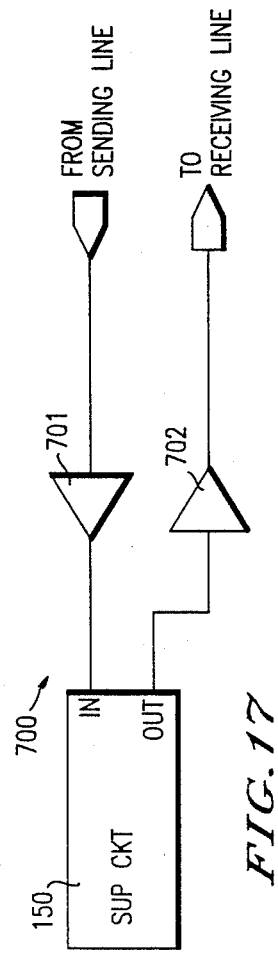
FIG. 16
FIG. 17

COMMUNICATION SYSTEM EMPLOYING MULTI-CONJUNCTION ARCHITECTURE

BACKGROUND OF THE INVENTION

The present invention generally relates to communication systems, and more particularly to a communication system employing a multi-conjunction architecture.

A multi-channel lattice communication network applicable to local area networks (LANs), public line networks and especially to a multi-media communication was previously proposed in a U.S. patent application Ser. No. 096,532 filed Sept. 15, 1987 in which the assignee is the same as the assignee of the present application. The proposed lattice communication network is analogous to nerve cells of a living body, and employs node apparatuses. Each node apparatus has a plurality of input and output channels and is used as a communication control element. Such node apparatuses are coupled in a multi-conjunction to constitute the lattice communication network. Each node apparatus transfers one of incoming digital signals according to a first-come-first-served logic (hereinafter simply referred to as a first-come-first-output logic).

The proposed lattice communication network has a large degree of freedom of network topology because of the multi-conjunction architecture. Thus, the survivability of data is high. In other words, even when a fault occurs in a path of the communication network, it is possible to carry out the communication through other paths. Furthermore, it is possible to select optimum paths for the communication because each node apparatus transfers the incoming digital signals according to the first-come-first-output logic.

On the other hand, the proposed lattice communication network employs a multi-channel system in which a plurality of connecting channels are established, so as to effectively achieve a full duplex communication. The proposed lattice communication network is effectively applicable to the physical layer to the network layer of the open system interconnection (OSI), for example.

In order to obtain a high data survivability in the lattice communication network, it is important that the effects of faults are minimized and the trouble shooting is carried out quickly. There are three major faults, namely, a first fault caused by the fault in the node apparatus itself, a second fault in the sending path, and a third fault in a receiving path. In the proposed lattice communication network, a probability that the communication will be interfered by the first through third faults is extremely small.

The proposed lattice communication network is capable of detecting a fault in a node apparatus or a terminal device which receives a signal from a predetermined node apparatus. However, in cases where a signal is broadcasted to a destination address which does not exist in the communication network or a fault occurs in a terminal device or a node apparatus in the communication network, the broadcasting of the signal to all of the node apparatuses within the communication network is continued. As a result, there are problems in that a new communication is interfered by the unnecessary continuation of the broadcasting and a set link (fixed communication path) cannot be cancelled.

SUMMARY OF THE INVENTION

Accordingly, it is a general object of the present invention to provide a novel and useful communication system employing the multi-conjunction architecture in which the problems described heretofore are eliminated.

Another and more specific object of the present invention is to provide a communication system employing the multi-conjunction architecture and having a plurality of transmission paths each coupling one node apparatus to another node apparatus or a terminal device, wherein a supervising circuit provided within a predetermined node apparatus supervises whether or not a returning signal is received by an input channel of the predetermined node apparatus from a destination terminal device within a specific time after a sending signal is received by another certain input channel of the predetermined node apparatus and transmitted from an output channel thereof, and the certain input channel is disconnected and separated from all of the output channels of the predetermined node apparatus when the returning signal is not received within the specific time. The disconnected certain channel may be returned to an initial state when the sending signal ceases or when a reset instruction is received. According to the communication system of the present invention, it is possible to avoid unnecessary continuation of a broadcasting of the sending signal and permit input channels other than the certain input channel for use in other communications.

Still another object of the present invention is to provide a communication system employing the multi-conjunction architecture and having a plurality of transmission paths each coupling one node apparatus to another node apparatus or a terminal device, wherein a supervising circuit supervises whether or not a sending signal received through a certain node apparatus continues over a specific time and transmits a pseudo returning signal to the certain node apparatus when the sending signal continues over the specific time, so as to set a link responsive to the pseudo returning signal. The supervising circuit may be provided within one or a plurality of predetermined node apparatuses, within one or a plurality of predetermined terminal devices, or provided in a supervising device which is provided in place of a terminal device. In addition, the set link may be released when the sending signal ceases or when a reset instruction is received. According to the communication system of the present invention, it is possible to avoid unnecessary continuation of a broadcasting of the sending signal and permit other communications in the communication system by avoiding the set link.

Other objects and further features of the present invention will be apparent from the following detailed description when read in conjunction with the accompanying drawings.

BRIEF DESCRIPTION OF THE DRAWINGS

FIG. 6 is a circuit diagram showing a first embodiment of a supervising circuit of the node apparatus shown in FIG. 2;

FIG. 7 is a circuit diagram showing a second embodiment of the supervising circuit of the node apparatus shown in FIG. 2;

FIGS. 8A through 8E are diagrams for explaining the sequence of the communication made in a lattice communication network using four node apparatuses;

FIG. 16 shows an embodiment of an essential part of a predetermined terminal device in FIG. 15 provided with the supervising circuit; and FIG. 17 shows an embodiment of a supervising device employed in a fourth embodiment of the communication system employing the multi-conjunction architecture.

DETAILED DESCRIPTION

Figure 1:
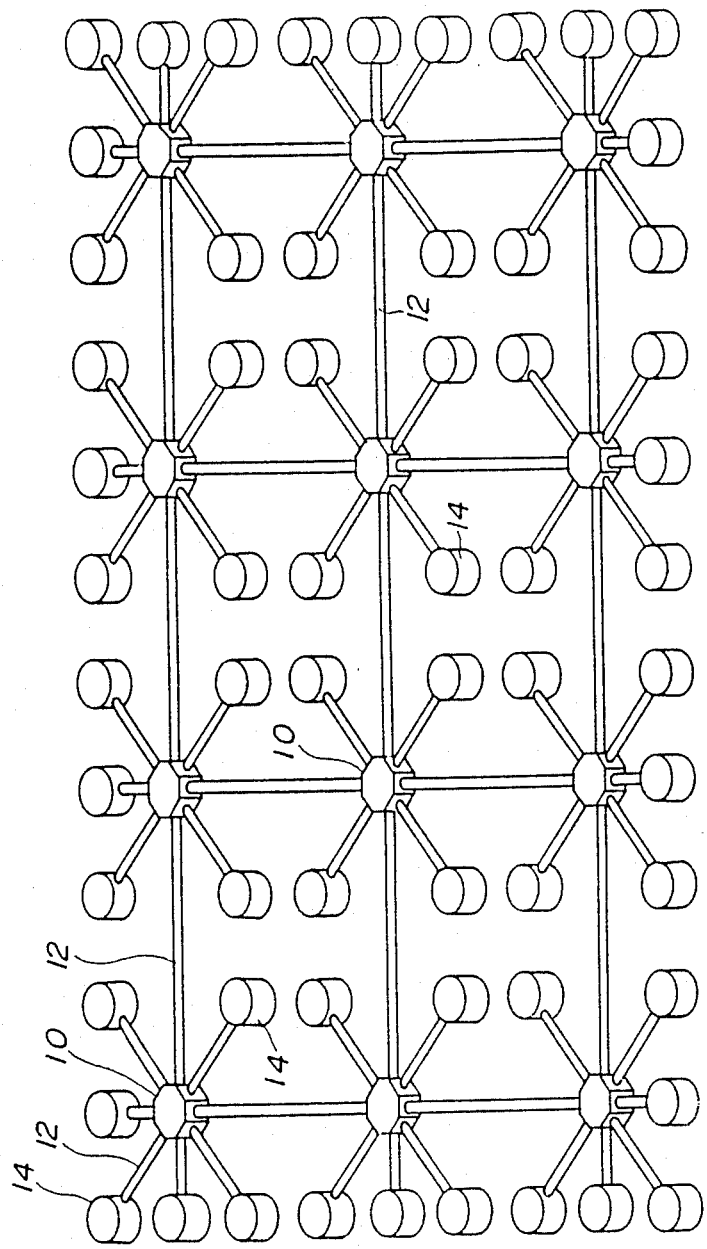
FIG. 1 shows the communication system employing the multi-conjunction architecture according to the present invention.

First, a description will be given on a first embodiment of the communication system employing the multi-conjunction architecture, by referring to FIG. 1. In FIG. 1, each node apparatus 10 is coupled to other node apparatuses 10 and/or terminal devices 14 through a transmission path 12 in two or three dimensions to constitute a lattice communication network. The communication system employing the multi-conjunction architecture may be a linear communication network or a loop shaped communication network.

There is no limit to the number of input and output channels of the node apparatus 10. Hence, there is no limit to the number of node apparatuses 10 and/or terminal devices 14 which may be coupled to the node apparatus 10 through the transmission path 12, provided that the number is within the capacity of input and output ports of the node apparatus 10. It is possible to constitute the entire communication network by a single node apparatus 10. In addition, it is possible to provide a plurality of node apparatuses 10 on a single printed wiring board and treat the wiring board as a single node apparatus, so as to essentially increase the capacity of the input and output ports.

In the present embodiment, the terminal device 14 can receive and transmit data asynchronously. For example, the terminal device 14 is a processing system such as a personal computer, a service station such as a filing station and a print station, and the like. It is desirable although not essential, that the data is transmitted in the form of message packets. As will be described later, it is desirable although not essential, that the terminal device 14 is designed for the full duplex communication and sends out a returning signal immediately after receipt of a sending signal (message packet) intended for the terminal device 14.

For example, the transmission path 12 is an optical transmission path constituted by optic fibers or an electrical transmission path constituted by twisted pair wire, coaxial cable and the like. In the present embodiment, the data is transmitted in analog or digital form, and the full duplex communication is carried out in the communication network. The transmission path 12 between the node apparatus 10 and the terminal device 14 may be designed for the half duplex communication. It is possible to provide a plurality of transmission paths 12 between the node apparatuses 10 depending on the traffic.

Figure 2:
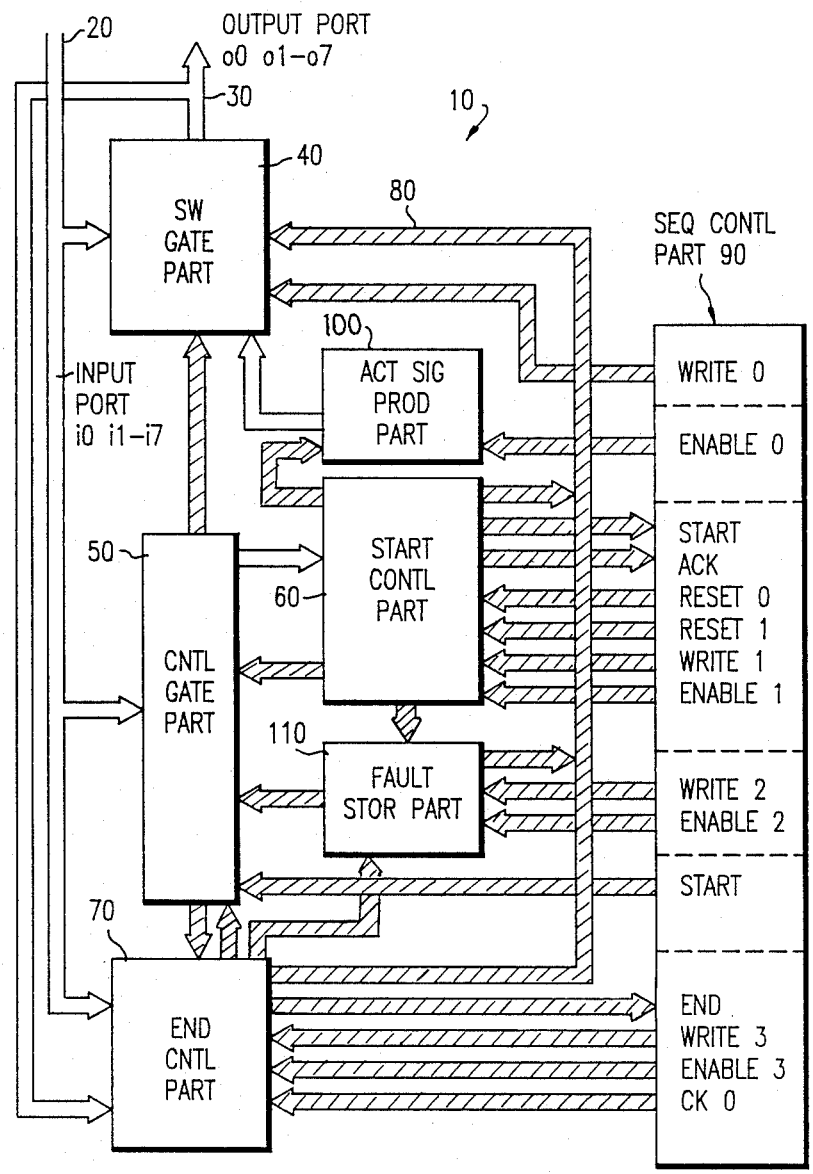
FIG. 2 is a system block diagram showing an embodiment of a node apparatus employed in the first embodiment.

FIG. 2 shows an embodiment of the node apparatus 10 used in the first embodiment. The node apparatus 10 generally comprises an input port 20, an output port 30, a switching gate part 40, a control gate part 50, a start control part 60, an end control part 70, a gate setting bus 80, a sequence control part 90, an active signal producing part 100 and a fault storage part 110.

The input port 20 is connected to receiving lines of the transmission path 12, while the output port 30 is connected to sending lines of the transmission path 12. The input port 20 is coupled to the output port 30 through the switching gate part 40. In the present embodiment, the input port 20 comprises eight receiving or input channels i0 through i7, and the output port 30 comprises eight sending or output channels o0 through o7. Hence, in the present embodiment, it is possible to connect up to eight node apparatuses 10 and/or terminal devices 14 to one node apparatus 10 through the transmission path 12. A pair of input channel and output channel having a corresponding channel number is coupled to another node apparatus 10 (or terminal device 14).

The switching gate part 40 selectively couples an arbitrary one of the input channels i0 through i7 to arbitrary ones of the output channels o0 through o7. The input port 20 is coupled to the start control part 60 and the end detecting part 70 through the control gate part 50. The control gate part 50 controls the supply of signals from the input port 20 to the start control part 60 and the supply of control signals from the start control part 60, the fault storage part 110 and the end control part 70 to the appropriate one of the switching gate part 40, the start control part 60 and the end control part 70.

The start control part 60 detects whether or not an input signal is received by the input port 20 and discriminates a first receiving input channel which receives the input signal first. The end control part 70 detects an end of the input signal received by the input channel connected to a set communication path, and carries out a communication ending process. The switching gate part 40, the start control part 60 and the end control part 70 are coupled to each other through the gate setting bus 80.

The active signal producing part 100 for producing an active signal is coupled to the switching gate part 40 and the start control part 60. The fault storage part 110 for storing data on a faulty or dormant input channel is coupled to the start control part 60, the end control part 70 and the gate setting bus 80.

The switching gate part 40, the control gate part 50, the start control part 60, the end control part 70, the active signal producing part 100 and the fault storage part 110 are respectively controlled by the sequence control part 90.

Figure 3:
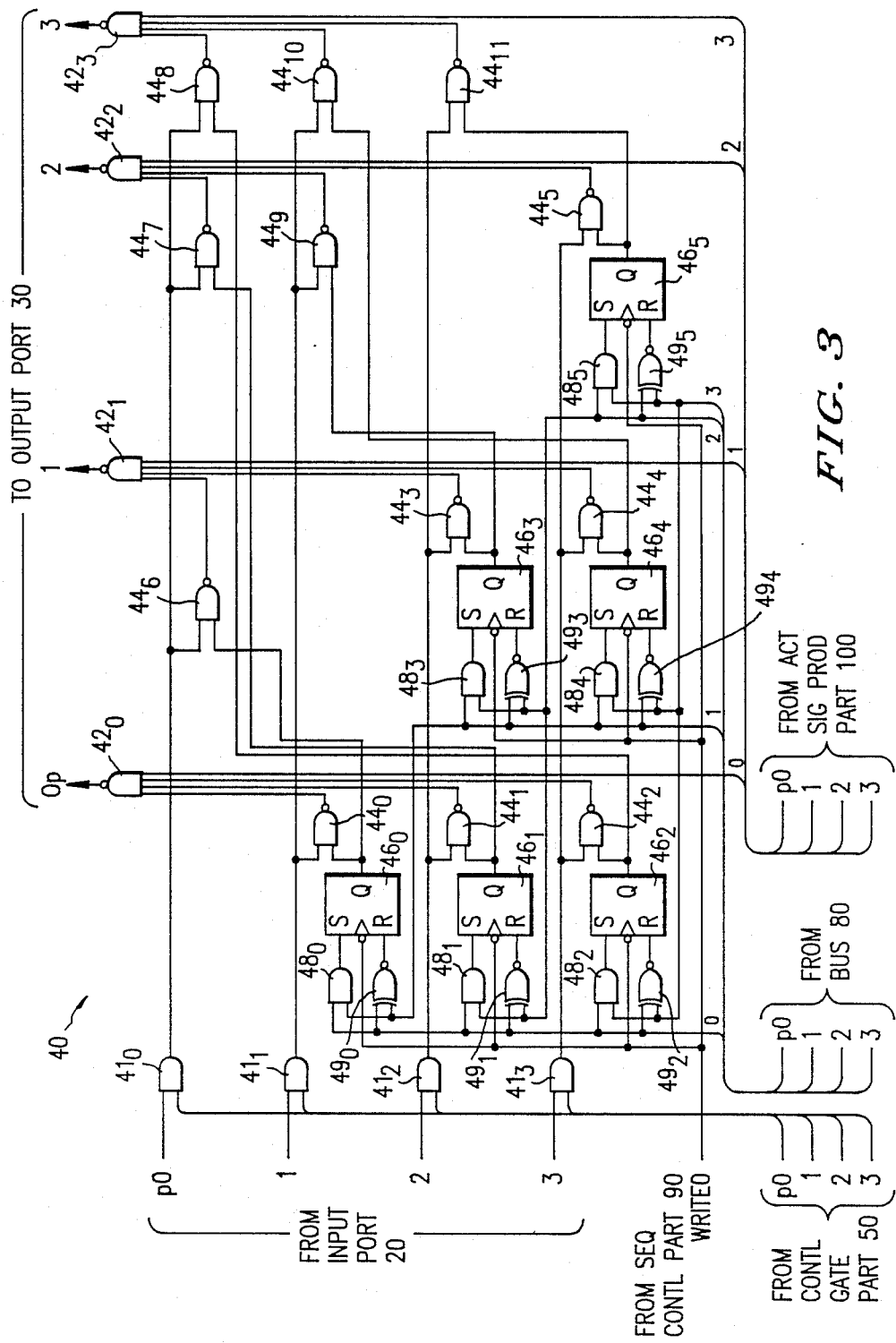
FIG. 3 is a circuit diagram showing an embodiment of a stretching gate part of the node apparatus shown in FIG. 2.

FIG. 3 shows an embodiment of the switching gate part 40 for four input and output channels. In FIG. 3, the numbers "0" through "3" indicated beside the terminals denote the channel numbers. The switching gate part 40 comprises four 2-input AND gates $41_0$ through $41_3$, four 4-input NAND gates $42_0$ through $42_3$, twelve $(4\times(4-1))$ 2-input NAND gates $44_0$ through $44_{11}$, six $(4\times(4-1)/2)$ SR flip-flops $46_0$ through $46_5$, six $(4\times(4-1)/2)$ 2-input AND gates $48_0$ through $48_5$, and six $(4\times(4-1)/2)$ exclusive-OR gates $49_0$ through $49_5$ which ae connected as shown.

Each of the AND gates $41_0$ through $41_3$ are connected to a corresponding one of the input channels i0 through i3 and to a corresponding one of outputs of the control gate part 50. An output of each of the AND gates $41_0$ through $41_3$ is connected to all of the NAND gates $42_0$ through $42_3$ except one of the NAND gates $42_0$ through $42_3$ corresponding to the input channel which is connected to each of the AND gates $41_0$ through $41_3$. An internal circuit of the switching gate part 40 is selectively connected to the input port 20 when a high-level signal is supplied to one of the AND gates $41_0$ through $41_3$ from the control gate part 50.

The following truth table shows the operation of each of the flip-flops $46_0$ through $46_5$. When the input channel and the output channel which are to be coupled are designated and the signal level on the control line of the gate setting bus 80 corresponding to the designated channel becomes high, the switching gate part 40 couples the designated input channel to the output channel responsive to a negative polarity clock pulse signal received from a terminal WRITE0 of the sequence control part 90. The designated and non-designated input and output channels are disconnected from each other. The non-designated input channel keeps the previously made connection. Accordingly, a multi-channel connection is made to simultaneously permit communication through a plurality of combinations of the coupling between the input and output channels of one node apparatus 10.

TABLE

| | Gate Setting Bus 80 | S | R | Q |
|---|---|---|---|---|
| Write | H | H | H | L | H |
| Erase | H | L | L | H | L |
| | L | H | L | H | L |
| Stable | L | L | L | L | $Q_0$ |

Accordingly, the states of the NAND gates $44_0$ through $44_{11}$ can be set in one control. In addition, the number of the flip-flops $46_0$ through $46_5$ for holding the states of the NAND gates $44_0$ through $44_{11}$ can be kept down to a minimum.

The active signal producing part 100 produces an active signal indicating that the node apparatus 10 and the input and output channels thereof are operating normally and the node apparatus 10 is active. The active signal has no restrictions except for the signal length thereof. The signal length of the active signal is set to a value which is longer than a minimum time required to operate flip-flops of the start control part 60 and terminates within the length of an active detection time constant which will be described later.

Figure 4:
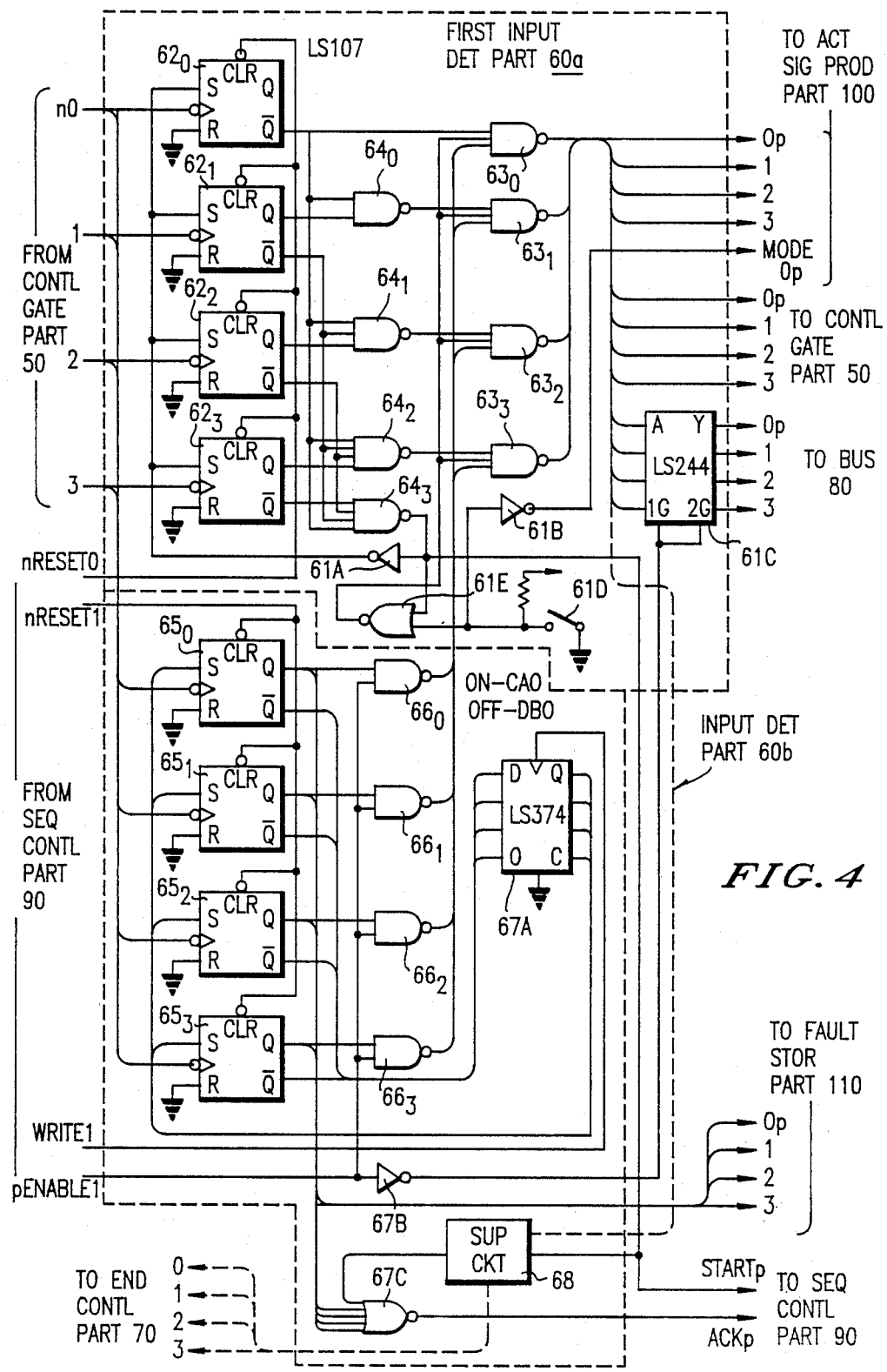
FIG. 4 is a circuit diagram showing an embodiment of a start control part of the node apparatus shown in FIG. 2.

FIG. 4 shows an embodiment of the start control part 60 for four input and output channels. The start control part 60 generally comprises a first input signal detecting part 60a and an input signal detecting part 60b. The first input signal detecting part 60a detects the input signals from the input channels i0 through i3 and discriminates which input signal is received first, that is, which input channel receives the input signal first, according to the first-come-first-output logic. The first input signal detecting part 60a comprises inverters 61A and 61B, a bus buffer 61C, a mode changing switch 61D, an OR gate 61E, four SR flip-flops $62_0$ through $62_3$, four 3-input NAND gates $63_0$ through $63_3$, and four NAND gates $64_0$ through $64_3$ which are connected as shown. The input signals from the input channels i0 through i3 are obtained through the control gate part 50 and are supplied to clock terminals of the flip-flops $62_0$ through $62_3$.

A signal from a terminal RESET0 of the sequence control part 90 is supplied to clear terminals CLR of the flip-flops $62_0$ through $62_3$. The flip-flops $62_0$ through $62_3$ constitute a circuit for holding the states of the input channels which receive the input signals. The 2-input NAND gate $64_0$, the 3-input NAND gate $64_1$ and the 4-input NAND gate $64_2$ constitute a circuit for assigning priorities to output signals of the flip-flops $62_0$ through $62_3$. The 4-input NAND gate $64_3$ and the inverter 61A constitute a circuit for holding the states of the flip-flops $62_0$ through $62_3$ by supplying a low-level signal to set terminals S of all of the flip-flops $62_0$ through $62_3$ responsive to the input signal supplied to one of the flip-flops $62_0$ through $62_3$. The circuit constituted by the 4-input NAND gate $64_3$ and the inverter 61A also has the function of reporting to the sequence control part 90 that a first sending signal is received.

The mode changing switch 61D is used to change a mode of the transmission between a control after output (CAO) mode and a detect before output (DBO) mode, and the mode changing switch 61D is constantly closed in the present embodiment to select the CAO mode. The OR gate 61E obtains a logical sum of an output signal of the mode changing switch 61D and the output signal of the NAND gate $64_3$, and supplies the logical sum to each of the NAND gates $63_0$ through $63_3$. The output signal of the NAND gate $64_3$ is also supplied to a terminal START of the sequence control part 90. The NAND gates $63_0$ through $63_3$ are also supplied with signals of corresponding channels of the input signal detecting part 60b. Furthermore, the NAND gates $63_0$ through $63_3$ are respectively supplied with the $\overline{Q}$-output of the flip-flop $62_0$ and the outputs of the NAND gates $64_0$ through $64_2$. The outputs of the NAND gates $63_0$ through $63_3$ are supplied to the active signal producing part 100 and the control gate part 50, and also to the gate setting bus 80 through the bus buffer 61C.

The input signal detecting part 60b detects whether or not an input signal is received by the input port 20. The input signal detecting part 60b comprises four SR flip-flops $65_0$ through $65_3$, four 2-input NAND gates $66_0$ through $66_3$, a flip-flop 67A, an inverter 67B, a 5-input OR gate 67C and a supervising circuit 68 which are connected as shown. The input signals from the input channels i0 through i3 are obtained through the control gate part 50 and are supplied to clock terminals of the flip-flops $65_0$ through $65_3$.

A signal from a terminal RESET1 of the sequence control part 90 is supplied to clear terminals CLR of the flip-flops $65_0$ through $65_3$. The flip-flops $65_0$ through $65_3$ constitute a circuit for holding the states of the input channels which receive the input signals. The flip-flop 67A stores the output states of the flip-flops $65_0$ through $65_3$, and supplies a low-level signal to the set terminals S of the flip-flops $65_0$ through $65_3$ to fix the states thereof. The NAND gates $66_0$ through $66_3$ constitute a gate circuit for controlling the connection of the outputs of the flip-flops $65_0$ through $65_3$ to the first input signal detecting part 60a. Each of the NAND gates $66_0$ through $66_3$ receive a signal from a terminal ENABLE1 of the sequence control part 90 and the Q-output of the corresponding one of the flip-flops $65_0$ through $65_3$. This signal from the terminal ENABLE1 is inverted in the inverter 67B and supplied to the bus buffer 61C of the first input signal detecting part 60a. The OR gate 67C obtains a logical sum of the Q-outputs of the flip-flops $65_0$ through $65_3$ and an output signal of the supervising circuit 68, and supplies to a terminal ACK of the sequence control part 90 the logical sum indicative of whether or not the first sending signal is received. The Q-outputs of the flip-flops $65_0$ through $65_3$ are also supplied to the fault storage part 110. A signal from a terminal WRITE1 of the sequence control part 90 is supplied to a clock terminal of the flip-flop 67A.

The supervising circuit 68 within the input signal detecting part 60b of the start control part 60 is basically coupled between the OR gate 67C and the line which is connected to the terminal START of the sequence control part 90. When no returning signal is received from a destination terminal device 14 within a specific time after the input signal is received at a certain input channel of the node apparatus 10, the supervising circuit 68 causes the switching gate part 40 to disconnect the certain input channel from the output channels and disconnect an output channel having a channel number corresponding to that of the specific input channel from the input channels. The supervising circuit 68 may be provided within all of the node apparatuses 10 in the communication network or only within one or a plurality of predetermined node apparatuses 10.

In FIG. 4, the connections to the supervising circuit 68 indicated by phantom lines are employed when using a second embodiment of the supervising circuit 68 which will be described later in conjunction with FIG. 7. Otherwise, the connections to the supervising circuit 68 indicated by solid lines are employed in the case of a first embodiment of the supervising circuit 68 which will be described later in conjunction with FIG. 6.

In other words, when the input signal is first received by a specific one of the input channels i0 through i7, the specific input channel is detected in the first input signal detecting part 60a and the output signal of the NAND gate $64_3$ indicative of the specific input channel is supplied to the terminal START of the sequence control part 90. The output signals of the NAND gates $63_0$ through $63_3$ indicative of the input channels which received an input signal are also supplied to the active signal producing part 100, the control gate part 50 and to the gate setting bus 80 through the bus buffer 61C. The input and output channels corresponding to the NAND gates $63_0$ through $63_3$ which output a high-level signal are connected to each other except for the input and output channels having the corresponding channel number in the switching gate part 40 which sets the link, while the input and output channels corresponding to the NAND gates $63_0$ through $63_3$ which output a low-level signal are disconnected from the input and output channels corresponding to the NAND gates $63_0$ through $63_3$ which output the high-level signal.

For example, when only a certain one of the NAND gates $63_0$ through $63_3$ outputs a high-level signal, the input and output channels corresponding to the certain NAND gate cannot be connected to any of the output and input channels in the switching gate part 40 which sets the link, even when a control pulse signal is received from the terminal WRITE0 of the sequence control part 90. That is, the input channel corresponding to the certain NAND gate is separated from all of the output channels and the output channel corresponding to the certain NAND gate is separated from all of the input channels. In the present embodiment, this separation of the input and output channels is used by supervising the output signal of the NAND gate $64_3$ in the supervising circuit 68 and forcibly setting the system to an acknowledge sequence when a high-level period of the signal from the NAND gate $64_3$ continues over a predetermined time. In other words, a pseudo acknowledge signal ACK is supplied to the sequence control part 90, and the switching gate part 40 sets the link of the input and output channels in the state where only one of the NAND gates $63_0$ through $63_3$ outputs the high-level signal, thereby separating the input channel corresponding to the certain NAND gate which outputs the high-level signal from all of the output channels. As a result, it is possible to avoid an abnormal state such as a failure within the communication network, unnecessary continuation of the broadcasting and fixed communication path which cannot be released (or cancelled). A description on the predetermined time referred above will be given later. The pseudo acknowledge signal ACK is essentially identical to a regular acknowledge signal ACK.

The fault storage part 110 is used to store one or more faulty or dormant input channels.

Figure 5:
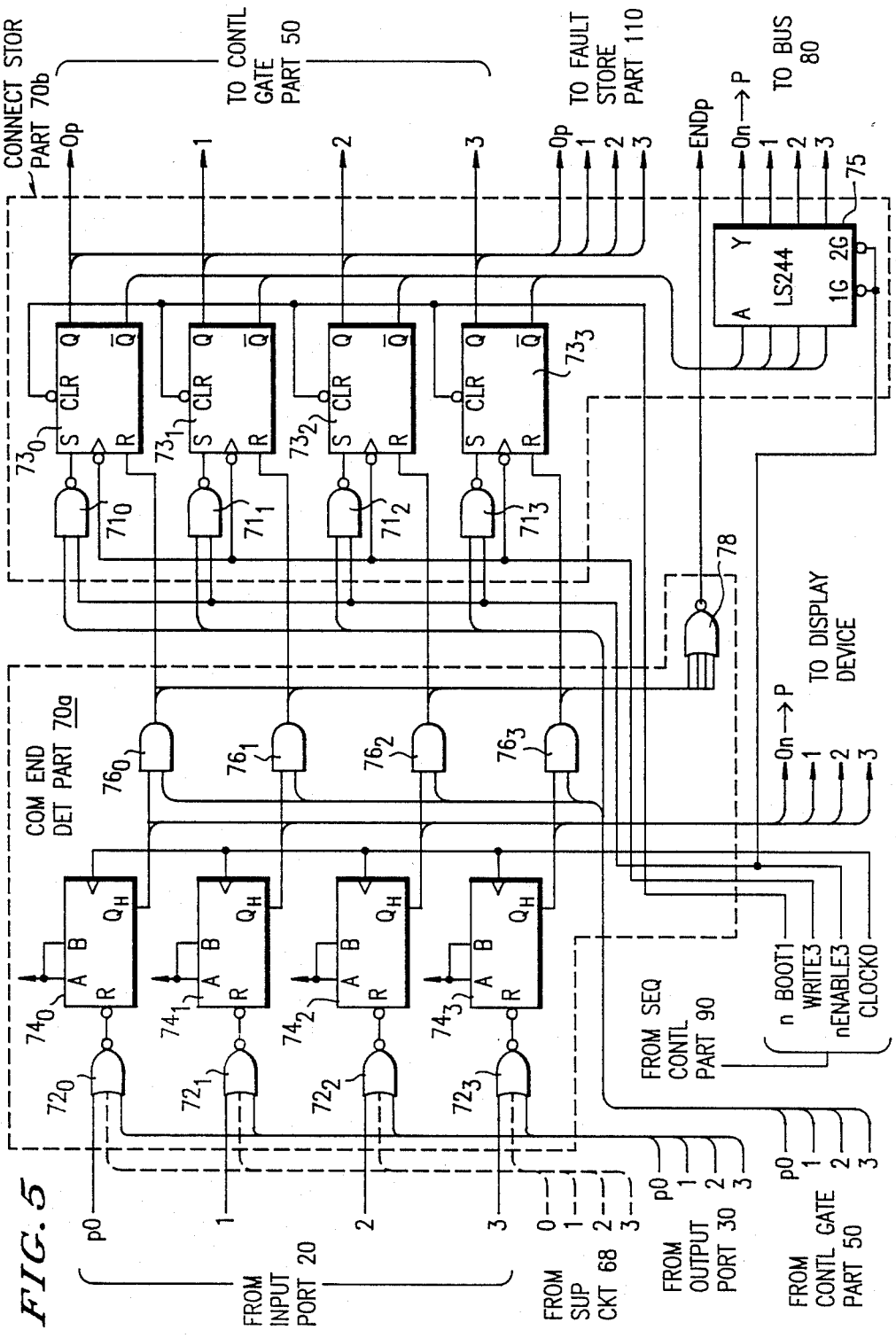
FIG. 5 is a circuit diagram showing an embodiment of an end control part of the node apparatus shown in FIG. 2.

FIG. 5 shows an embodiment of the end control part 70 for four input and output channels. The end control part 70 generally comprises a communication end detecting part 70a and a connection storage part 70b. The communication end detecting part 70a comprises four 2-input NOR gates $72_0$ through $72_3$ (or four 3-input NOR gates as indicated by phantom lines in the case where the second embodiment of the supervising circuit 68 is used), four shift registers $74_0$ through $74_3$, four 2-input AND gates $76_0$ through $76_3$, and a 4-input OR gate 78 which are connected as shown.

Each of the NOR gates $72_0$ through $72_3$ receive signals of a corresponding channel from the input port 20 and the output port 30 (and the supervising circuit 68 as indicated by phantom lines in the case where the second embodiment of the supervising circuit 68 is used). The outputs of the NOR gates $72_0$ through $72_3$ are supplied to reset terminals R of the corresponding shift registers $74_0$ through $74_3$. The shift registers $74_0$ through $74_3$ detect the end of the communication based on a communication end detection time constant as will be described later.

A system clock signal from a terminal CK0 of the sequence control part 90 is supplied to clock terminals of the shift registers $74_0$ through $74_3$. Each of the AND gates $76_0$ through $76_3$ receive a signal of a corresponding channel from the control gate part 50 and the $Q_H$-output of the corresponding one of the shift registers $74_0$ through $74_3$. The OR gate 78 obtains a logical sum of the outputs of the AND gates $76_0$ through $76_3$ and reports to the sequence control part 90 through a terminal END that he communication is ended in the fixed communication path or that the first sending signal received by the first receiving input channel is interrupted. The control gate part 50 controls the AND gates $76_0$ through $76_3$ to determine whether the OR gate 78 is to report the end of the communication or the interruption of the sending signal. As may be readily seen from FIG. 5, the end control part 70 discriminates that the communication is ended when signals no longer exist in both the two input channels included in the fixed communication path which is used for the communication.

The communication end detection time constant is provided to detect that no signal continues after the sending signal (or returning signal) and the communication is ended. The length of the communication end detection time constant is set to a time which is required to discriminate the true end of the communication from consecutive "0"s or "1"s in the case of the full duplex communication, and normally, a slight margin is added to the length of the communication end detection time constant. In other words, the length of the communication end detection time constant is one bit in the case of the Manchester encoding, and is seven or more bits in the case of the encoding in which "0" is inserted into six consecutive "1"s in non-return-to-zero invert (NRZI), for example. Normally, the length of the communication end detection time constant is made two times longer to add the slight margin time, that is, to two bits or fourteen or more bits.

When enabling both the full duplex communication and the half duplex communication, the length of the communication end detection time constant is set to a time which is essentially equal to a sum of a propagation delay time and a return trip covering the maximum tolerable distance between the node apparatus 10 and another node apparatus 10 or the terminal device 14 and a time it takes for the terminal device 14 to send a returning (or sending) signal after receipt of a sending (or returning) signal. Normally, a slight margin time is added to this length of the communication end detection time constant.

The connection storage part 70b comprises four 2-input AND gates $71_0$ through $71_3$, four SR flip-flops $73_0$ through $73_3$, and a bus buffer 75 which are connected as shown in FIG. 5. Each of the AND gates $71_0$ through $71_3$ receive a signal from a terminal ENABLE3 of the sequence control part 90 and a signal of the corresponding channel from the control gate part 50. The outputs of the AND gates $71_0$ through $71_3$ are supplied to set terminals S of the corresponding flip-flops $73_0$ through $73_3$, and the outputs of the AND gates $76_0$ through $76_3$ within the communication end detecting part 70a are supplied to reset terminals R of the corresponding flip-flops $73_0$ through $73_3$. In addition, a signal from a terminal WRITE3 of the sequence control part 90 is supplied to clock terminals of the flip-flops $73_0$ through $73_3$. The Q-outputs of the flip-flops $73_0$ through $73_3$ are supplied to the control gate part 50 and the fault storage part 110, while the $\overline{Q}$-outputs of the flip-flops $73_0$ through $73_3$ are supplied to the bus buffer 75.

The flip-flops $73_0$ through $73_3$ store data indicative of the channels in the communication path which is fixed, and the AND gates $71_0$ through $71_3$ control the write-in and erasure of the data in the flip-flops $73_0$ through $73_3$.

Accordingly, in the end control part 70 shown in FIG. 5, the shift registers $74_0$ through $74_3$ can constantly detect the end of the communication in all of the channels. In other words, it is possible to detect the end of the communication in a channel which is not selected by the control gate part 50. For this reason, there is no delay corresponding to the communication end detection time constant when detecting the end of the communication immediately after the selected channel is changed.

The communication end detection time constant simply needs to be set appropriately for the case where the full duplex communication is chosen and the case where both the full duplex communication and the half duplex communication are to be enabled. Accordingly, there is no need to modify the hardware of the end control part 70 itself.

In FIG. 5, it is possible to use four 2-input NAND gates (or four 3-input NAND gates in the case where the second embodiment of the supervising circuit 68 is used) in place of the NOR gates $72_0$ through $72_3$. In this case, the end control part 70 discriminates that the communication is ended when a signal no longer exist in one of the two input channels included in the fixed communication path which is used for the communication.

The sequence control part 90 comprises a group of gates for producing control signals which are essential in controlling the node apparatus 10 and a circuit part for assigning priority to the end of the communication when there is a contention between the start of the communication and the end of the communication. The active detection time constant and an input signal detection time constant are determined in the sequence control part 90. There is no need to modify the hardware of the sequence control part 90 itself between the case where the full duplex communication is chosen and the case where both the full duplex communication and the half duplex communication are to be enabled.

FIG. 6 shows a first embodiment of the supervising circuit 68 together with the OR gate 67C. The first embodiment of the supervising circuit 68 comprises a timer circuit 680 which supervises the continuity of the high-level state of the output signal of the NAND gate $64_3$, and produces the pseudo acknowledge signal ACK through the OR gate 67C. As described before, the pseudo acknowledge signal ACK is essentially identical to the regular acknowledge signal ACK.

In the present embodiment, the input signal at the channel of the input port 20 has a low level in an initial state. The timer circuit 680 starts to count a clock signal CLOCK1 responsive to a high level of the output signal of the NAND gate $64_3$. When the high level of the signal from the NAND gate $64_3$ continues for the specific time described before, that is, when the broadcasting state is continued, the timer circuit 680 set a $Q_H$-output thereof to a high level. The high-level $Q_H$-output of the timer circuit 680 is passed through the OR gate 67C and is supplied to the sequence control part 90 as the pseudo acknowledge signal ACK. Responsive to this supply of the pseudo acknowledge signal ACK to the sequence control part 90, the switching gate part 40 sets the link in the state where only one of the output signals of the NAND gates $63_0$ through $63_3$ has the high level, and separates the input channel corresponding to the NAND gate with the high-level output from the output channels and separates the output channel corresponding to the NAND gate with the high-level output from the input channels. The separated input and output channels are released when the input signal ceases, and the input and output channels are restored to the initial state. Accordingly, it is possible to avoid an abnormal state such as the unnecessary continuation of the broadcasting. By varying the frequency of the clock signal CLOCK1, it is possible to change the time constant of the timer circuit 680, that is, change the supervision time for separating the input channel in which the broadcasting is continued.

The specific time is a time period in which the receipt of a first returning signal is guaranteed. In the case of the full duplex communication, the specific time starts from a time when the input channel which first receives the first sending signal is detected. The specific time is set to a time which is essentially equal to a sum of a propagation delay time for a return trip covering a maximum tolerable distance between the node apparatus 10 and another node apparatus 10 or the terminal device 14 and a time it takes for the receiving terminal device 14 to start sending the first returning signal after receipt of the first sending signal. In the case where both the full duplex communication and the half duplex communication are to be included, the specific time starts from the end of the first sending signal. In this case, the specific time is set to a time which is essentially equal to a sum of a propagation delay time for a return trip covering a maximum tolerable distance between the node apparatus 10 and another node apparatus 10 or the terminal device 14 and a time it takes for the receiving terminal device 14 to start sending the first returning signal after the receipt of the first sending signal ends. Normally, a slight margin time is added to the length of the specific time.

In the supervising circuit 68 shown in FIG. 6, the separated channels are released immediately after the input signal, that is, the first sending signal ceases. However, it is possible not to release the link until a reset instruction is received, even after the input signal ceases, as is done in the second embodiment of the supervising circuit 68.

FIG. 7 shows the second embodiment of the supervising circuit 68 for four input and output channels. The second embodiment of the supervising circuit 68 comprises the timer circuit 680, an inverter 681, AND gates $682_0$ through $682_3$, flip-flops $683_0$ through $683_3$ and an OR gate 684. The $Q_H$-output of the timer circuit 680 is inverted in the inverter 681 and is supplied in common to the AND gates $682_0$ through $682_3$. A $Q_G$-output of the timer circuit 680 is supplied to the OR gate 67C and also in common to the AND gates $682_0$ through $682_3$. The AND gates $682_0$ through $682_3$ are further supplied with the output signals of the corresponding NAND gates $63_0$ through $63_3$ of the start control part 60. Reset terminals R of the flip-flops $683_0$ through $683_3$ are grounded through respective reset switches $RSW_0$ through $RSW_3$ when these reset switches are closed.

Q-outputs of the flip-flops $683_0$ through $683_3$ are passed through the OR gate 684 and is outputted as a maintenance information MON0 for monitoring. For example, this maintenance information MON0 is used to display that an abnormal state such as a failure in the communication network, unnecessary continuation of the broadcasting and non-releasable set link has occurred, and the separation of the channels is carried out responsive to the pseudo acknowledge signal ACK. The Q-outputs of the flip-flops $683_0$ through $683_3$ are also outputted as maintenance information MON1 through MON4, so as to display the individual channel in which the channel separation is carried out responsive to the pseudo acknowledge signal ACK, for example. The maintenance information MON1 through MON4 are also supplied to the corresponding NOR gates $72_0$ through $72_3$ of the end control part 70. The maintenance information MON0 through MON4 may be transmitted outside the communication network for analyzing the utilization of the communication network and for the maintenance of the communication network.

The signal level at set terminals S of the flip-flops $683_0$ through $683_3$ becomes high when the $Q_G$-output of the timer circuit 680 is high, the $Q_H$-output of the timer circuit 680 is low and the corresponding NAND gates $63_0$ through $63_3$ output a high-level signal. Thereafter, the input signal level of all of the flip-flops $683_0$ through $683_3$ becomes low when the $Q_H$-output of the timer circuit 680 becomes high, and the flip-flops $683_0$ through $683_3$ are no longer set. The Q-outputs of the set ones of the flip-flops $683_0$ through $683_3$ are passed through the corresponding NOR gates $72_0$ through $72_3$ of the end control part 70 and are supplied to the corresponding flip-flops $74_0$ through $74_3$ so as to maintain the set link. The set link is maintained until the corresponding reset switches $RSW_0$ through $RSW_3$ are opened to reset the corresponding flip-flops $683_0$ through $683_3$. In other words, in the supervising circuit 68 shown in FIG. 7, the set link is not released until the reset instruction is given by opening the reset switches $RSW_0$ through $RSW_3$ in the channels in which the channel separation is carried out, even when the input signal, that is, the first sending signal ceases.

In the initial state where no communication is made between the input and output channels of the node apparatus 10, the gates of the switching gate part 40 are open and signals can pass through the node apparatus 10 because the input port 20 and the output port 30 are coupled through the switching gate part 40. In this initial state, each input channel is coupled to all of the output channels except the output channel having a channel number corresponding thereto.

In the initial state, when the input signal is supplied to one of the input channels i0 through i3 (i0 through i7 in FIG. 2), the first input signal detecting part 60a detects which one of the input channels i0 through i3 receives the input signal first according to the first-come-first-output logic. As a result, only the first receiving input channel is coupled to those output channels other than the output channel having a channel number corresponding to that of the first receiving input channel. In other words, a broadcast communication is made by transferring the input signal which is received by the first receiving input channel of the input port 20 to all of the output channels of the output port 30 except for the output channel having the channel number corresponding to that of the first receiving input channel.

When the first input signal detecting part 60a detects the first receiving input channel, the sequence control part 90 is activated, and the sequence control part 90 starts a time supervision with the active detection time constant.

The active detection time constant is provided to receive active signals from input channels other than the first receiving input channel. Accordingly, even when the input signal from the same source as the input signal received by the first receiving input channel is received by another input channel or when another input signal from another source is received by another input channel, the input signals received by the input channels other than the first receiving input channel can be received.

The length of the active detection time constant is set to a time which is essentially equal to a sum of a propagation delay time for a return trip covering a maximum tolerable distance between the node apparatus 10 and another node apparatus 10 or the terminal device 14 and the duration of the active signal. Normally, a slight margin time is added to the length of the active detection time constant. The input signal identical to that received by the first receiving input channel but obtained through a roundabout route are received by an input channel other than the first receiving input channel, the input signals from other sources are received by the input channels other than the first receiving input channel and the active signal is received from the active signal producing part 100, all within the length of the active detection time constant. Hence, it is possible to detect the faulty or dormant channels.

The input channels which receive the input signals within a first supervision time defined by the active detection time constant are stored in the flip-flops $65_0$ through $65_3$ of the input signal detecting part 60b. When the first supervision time ends, the clock signal from the terminal WRITE2 of the sequence control part 90 drives the fault storage part 110. As a result, out of the input channels i0 through i3, one or more input channels which receive no input signal during the first supervision time are stored in the fault storage part 110 as being faulty or dormant input channels.

Next, the sequence control part 90 carries out a time supervision of the input signal detection time constant. The input signal detection time constant is provided to detect whether or not there is an input signal after the first supervision time defined by the active detection time constant. For example, the length of the input signal detection time constant is one bit in the case of the Manchester encoding, and is seven or more bits in the case of the encoding in which "0" is inserted into six consecutive "1"s in NRZI. Normally, a slight margin time is added to the one or seven bits to make it two times longer, and the length of the input signal detection time constant is set to two bits or fourteen or more bits. A second supervision time defined by the input signal detection time constant is thus provided to detect the input channels which receive the input signal identical to that received by the first receiving input channel but obtained through a roundabout route, the input signals from sources other than the source of the input signal received by the first receiving input channel and the active signal, while distinguishing the input signals from the active signal.

One or more input channels which receive input signals within the second supervision time are stored in the flip-flops $65_0$ through $65_3$ of the input signal detecting part 60b. When the second supervision time ends, the input channel which receives no input signal within the second supervision time but thereafter receives an input signal is coupled to the output channel having the channel number corresponding to that of the first receiving input channel.

When the input signal ceases in any of the input channels included in the communication path and a third supervision time defined by the communication end detection time constant elapses, the end control part 70 instructs the sequence control part 90 to reset the first input signal detecting part 60a and the input signal detecting part 60b of the start control part 60 to the initial state.

The end of the communication may be detected from the input signal received by the first receiving input channel, so that a restore process is carried out when the input signal is no longer received by the first receiving input channel. Alternatively, it is possible to carry out the restore process when the input signal is no longer obtained at either one of the first receiving input channel or the output channels coupled to the first receiving input channel. It is possible to detect that an input signal is no longer obtained at a channel when the logic value of the input signal remains the same (for example, "0") for a certain time.

According to the present embodiment, the data on an input channel which receives a signal during the first supervision time but receives no signal during the second supervision time is stored in the input signal detecting part 60b even after the second supervision time, and only the input signal to such an input channel can be detected. It is possible to thereafter couple such an input channel to the output channel having the channel number corresponding to that of the first receiving input channel, and disconnect all of the other remaining input channels from the output channels.

When a certain input channel which receives a signal during the first supervision time but receives no signal during the second supervision time thereafter receives a first returning signal, the certain input channel is coupled to the output channel having the channel number corresponding to that of the first receiving input channel and the first receiving input channel is coupled to the output channel having a channel number corresponding to that of the certain input channel, so as to fix the coupling between the input and output channels of the node apparatus 10. All of the input channels other than the certain input channel and the first receiving input channel are connected to the output channels other than the output channels having the channel numbers corresponding to those of the certain input channel and the first receiving input channel.

Next, a description will be given on the sequence of the communication made in a lattice communication network using four node apparatuses 10 described heretofore, by referring to FIGS. 8A through 8E. For convenience' sake, four node apparatuses 10A through 10D are coupled in the lattice form through transmission paths 12A, 12AB, 12AC, 12BD, 12CD and 12D each having four channels in FIGS. 8A through 8E. A terminal device 14A is coupled to the node apparatus 10A, and a terminal device 14D is coupled to the node apparatus 10D. In FIGS. 8A through 8E, a dot-pattern is provided on the transmitting side of each node apparatus or terminal device, a bold arrow indicates the flow of the sending signal, and an arrow with hatchings indicates the flow of the active signal and the returning signal.

When carrying out the full duplex communication in the present embodiment, the detection of the input signal and the control of the coupling between the input and output channels based on this detection are carried out in the following five basic steps.

Figure 8A:
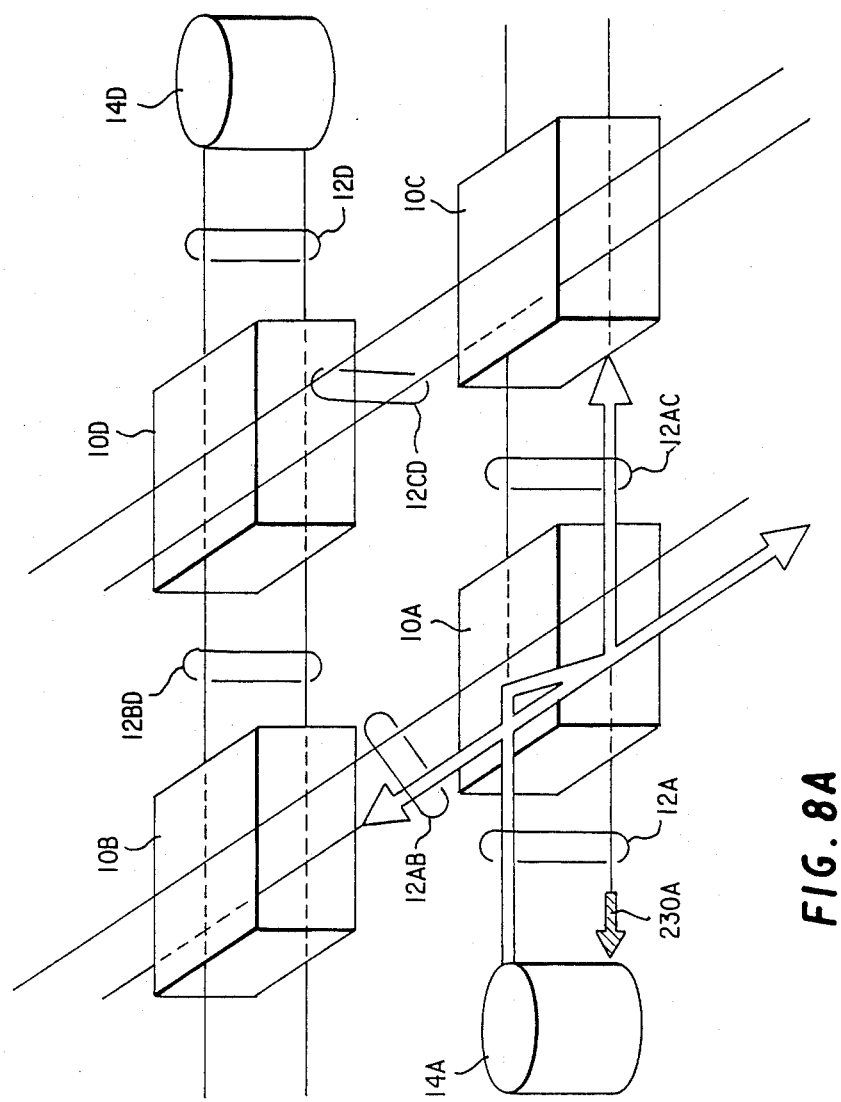

Firstly, the lattice network is in the initial state, and in a first step shown in FIG. 8A, the terminal device 14A, for example, transmits a first sending signal in the form of the message packet. The sending signal includes a destination address indicative of the intended destination of the sending signal, and the intended destination included in the first sending signal is the terminal device 14D in this case. The first sending signal is supplied to the node apparatus 10A through the transmission path 12A. In the initial state, each input channel of the node apparatus 10A is coupled to all of the output channels thereof except the output channel having a channel number corresponding thereto.

When the node apparatus 10A detects that the first sending signal from the terminal device 14A is received first, the node apparatus 10A transfers the first sending signal to all of the output channels thereof except the output channel having the channel number corresponding to that of the first receiving input channel which is connected to the transmission path 12A. In other words, the first sending signal is broadcasted from the node apparatus 10A from the output channels connected to the transmission paths 12AB, 12AC and the like. In addition, the node apparatus 10A disconnects from the output channels thereof the input channels which are other than the first receiving input channel and are not in the fixed transmission path, and an active signal 230A is produced from the active signal producing part 100 and is outputted from the output channel of the node apparatus 10A having the channel number corresponding to that of the first receiving input channel which is connected to the transmission path 12A.

Figure 8B:
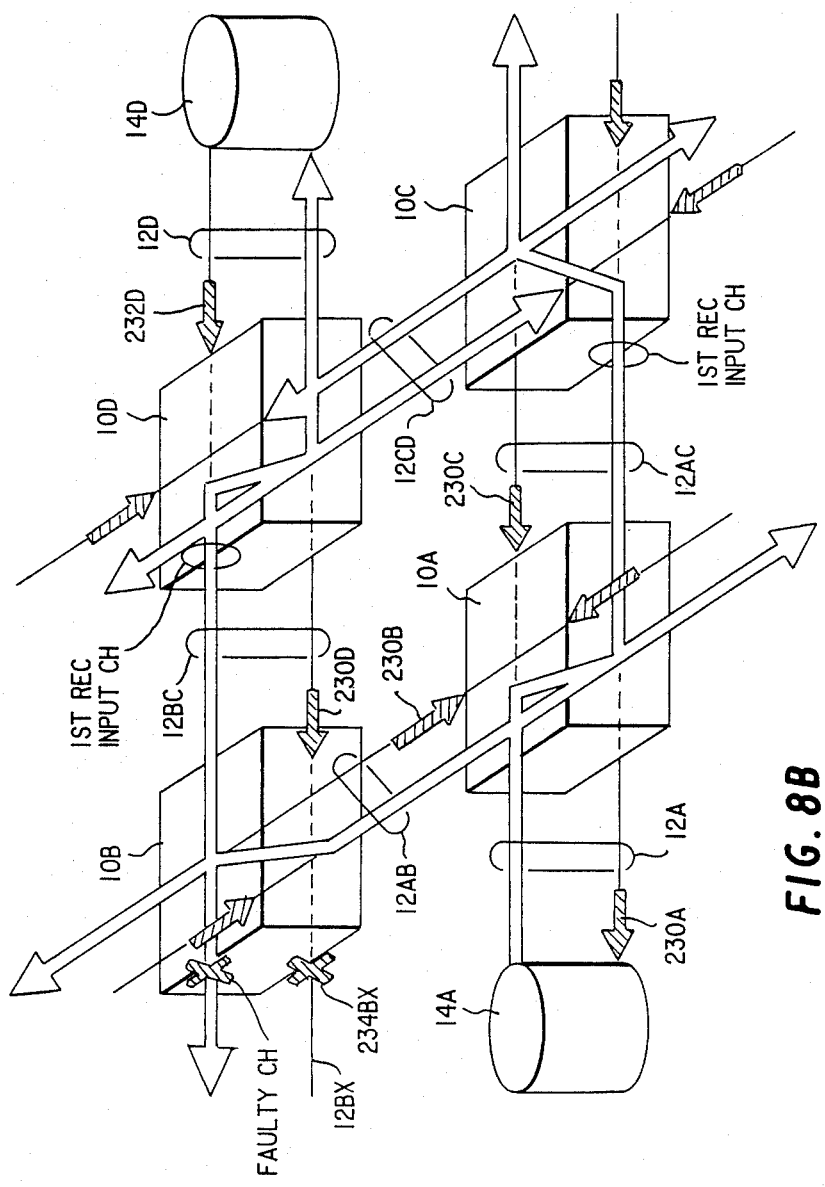

Next, in a second step shown in FIG. 8B, the node apparatus 10B receives the first sending signal through the transmission path 12AB, the node apparatus 10C receives the first sending signal through the transmission path 12AC, and the node apparatus 10D receives the first sending signal through the transmission paths 12BD and 12CD. The node apparatuses 10B, 10C and 10D broadcast the first sending signal similarly as in the case of the node apparatus 10A. In this case, the node apparatus 10C detects the input channel thereof connected to the transmission path 12AC as being the first receiving input channel. Hence, the first sending signal received through the transmission path 12AC is broadcasted through the transmission paths other than the transmission path 12AC, that is, through the transmission path 12CD and the like. In addition, the node apparatus 10C supplies an active signal 230C to an output channel thereof having a channel number corresponding to that of the first receiving input channel which is connected to the transmission path 12AC.

The node apparatus 10D receives the first sending signal from the transmission paths 12BD and 12CD, but detects the input channel thereof connected to the transmission path 12BD as being the first receiving input channel. Hence, the node apparatus 10D broadcasts only the first sending signal received through the transmission path 12BD to other transmission paths such as the transmission paths 12D and 12CD. The first sending signal received through the transmission path 12CD is not broadcasted from the node apparatus 10D. In addition, the node apparatus 10D supplies an active signal 230D to an output channel thereof having a channel number corresponding to that of the first receiving input channel which is connected to the transmission path 12BD.

In the node apparatuses 10C and 10D, when the difference between the arrival time of the first sending signal received by the first receiving input channel and the arrival time of the first sending signal received thereafter by another input channel is shorter than the time it takes for the control of the coupling of the input and output channels to be completed, a signal overlap occurs for an instant. However, this signal overlap occurs within the beginning portion of a preamble of the message packet and is negligible, and for this reason, no problems will be caused thereby. Thus, the first sending signal transmitted from the terminal device 14A and broadcasted from the node apparatus 10A is transmitted within the communication network without any signal overlap that would cause problems. Further, this negligible signal overlap is not accumulated at each node apparatus, since the signal overlap always occurs within the same beginning portion of the preamble of the message packet.

Each of the node apparatuses 10A through 10D supervise all of the input channels thereof within the first supervision time which starts from the detection of the first receiving input channel, so as to detect the input channel which receives no signal during the first supervision time. The data on the input channel which receives no signal during the first supervision time is stored in the input signal detecting part 60b. In the normal state where no fault exists in the node apparatus nor the node apparatuses and the terminal devices coupled thereto, the active signal or the first sending signal should arrive to the input channels during this first supervision time. When the active signal does not arrive to an input channel, this input channel is discriminated as being a faulty or dormant input channel, and the data on the faulty or dormant input channel is stored in the fault storage part 110. For example, in FIG. 8B, an input channel 234BX of the node apparatus 10B connected to a transmission path 12BX is a faulty or dormant input channel.

Each of the node apparatuses 10A through 10D supervise all of the input channels thereof within the second supervision time which starts after the lapse of the first supervision time. At this time, the active signal is already ended. The input channel which receives no input signal during the second supervision time may be coupled to all of the output channels other than the output channel having a channel number corresponding to that of this input channel. The input channel which receives no input signal during the second supervision time and is not identified as being a faulty or dormant input channel in the fault storage part 110 may be coupled to all of the output channels other than the output channel having a channel number corresponding to that of this input channel.

In a third step, the terminal devices coupled to the node apparatuses 10A through 10D receive the first sending signal originating from the sending terminal device 14A, and each terminal device returns the active signal as the returning signal upon receipt of the first sending signal and also collates its own address with the destination address included in the first sending signal. In this case, the terminal device 14D returns an active signal 232D as shown in FIG. 8B, and since the destination address included in the first sending signal coincides with the address of the terminal device 14D, the terminal device 14D transmits a first returning signal to the transmission path 12D. When the node apparatus 10D receives the first returning signal from the transmission path 12D as shown in FIG. 8C, the node apparatus 10D detects out of the input channels having channel numbers corresponding to those of the output channels from which the first sending signal was transmitted the input channel which receives no signal during the second supervision time but receives a signal after the end of the second supervision time. This detected input channel is coupled to the output channel having the channel number corresponding to that of the first receiving input channel.

In the case shown in FIG. 8C, when the node apparatus 10D receives the first returning signal from the transmission path 12D after a predetermined time elapses from the second supervision time, the node apparatus 10D connects the input channel which receives the first returning signal to the output channel which has a channel number corresponding to that of the first receiving input channel and is connected to the transmission path 12BD. Accordingly, the first returning signal from the transmission path 12D is outputted from the node apparatus 10D through the transmission path 12BD.

Then, after a terminal response supervision time in the case of the full duplex communication and after the third predetermined time defined by the communication end detection time constant in the case where both the full duplex communication and the half duplex communication are to be enabled, the node apparatus 10D couples all of the remaining input channels to all of the output channels other than the output channel having the channel number corresponding to that of the input channel which received the first returning signal. As a result, it is possible to prevent the node apparatus 10D from detecting the first sending signal from the transmission path 12CD shown in FIG. 8D. In other words, in this case, the transmission paths 12BD and 12D become coupled to each other.

Figure 8D:
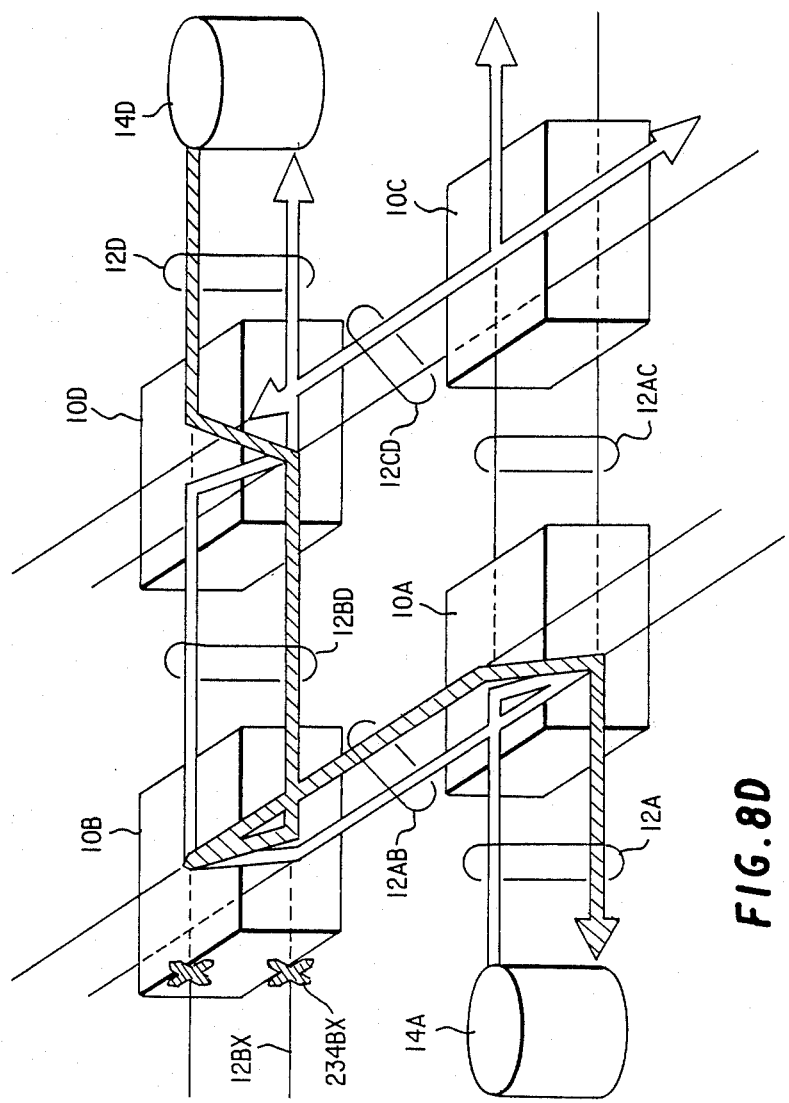

In a fourth step, the node apparatuses 10B and 10A carry out control similar to that carried out by the node apparatus 10D. Hence, as shown in FIG. 8D, the first returning signal reaches the terminal device 14A through the communication path which was used to transfer the first sending signal. The first sending signal has a predetermined length, and the terminal devices such as the terminal device 14D transmit the first returning signal immediately after the destination address of the first sending signal is discriminated. Accordingly, the first sending signal and the first returning signal are transmitted simultaneously. For this reason, even when terminal devices other than the terminal devices 14A and 14D are connected to the communication network, these other terminals receive the overlapping first sending signal and the first returning signal and cannot discriminate the information content due to the interference caused by the overlap. Therefore, the secrecy of the transmission to the other terminal devices which is very important in the communication network is maintained. In addition, it is possible to carry out the multi-channel communication.

Figure 8E:
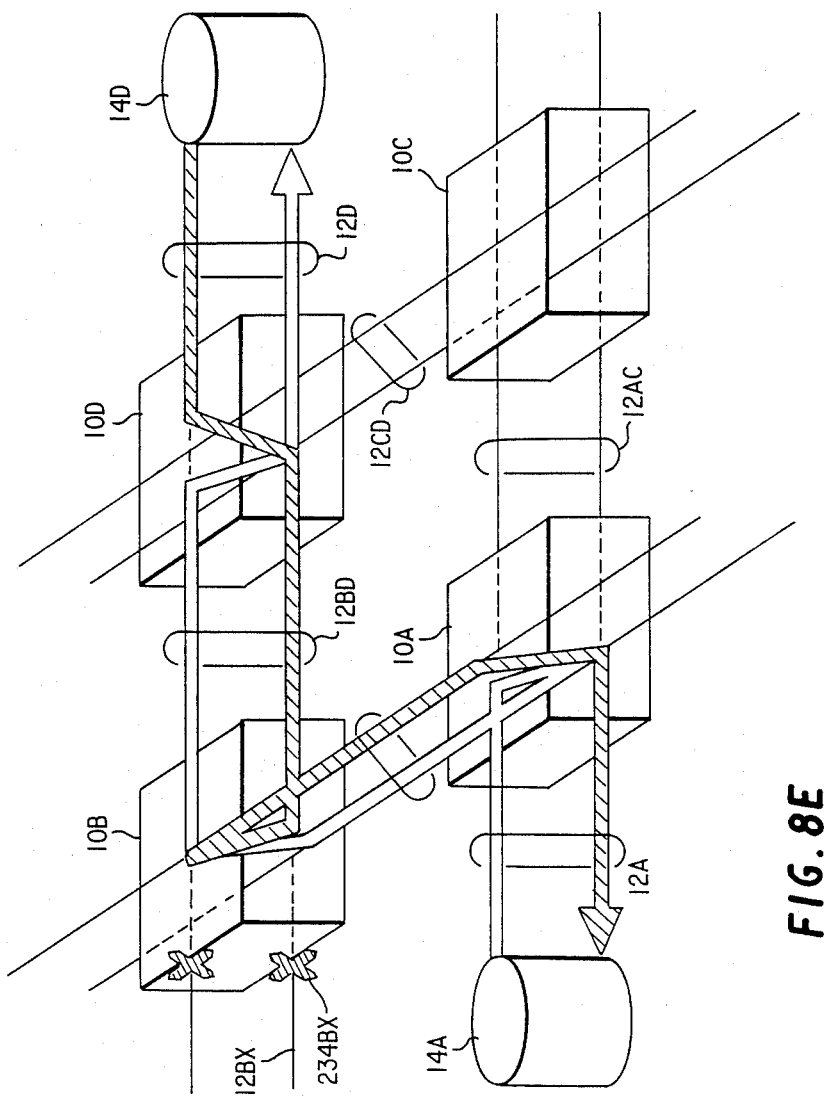

In a fifth step shown in FIG. 8E, when the node apparatus 10C detects that the first returning signal is not received through the transmission path 12CD and the like and the first sending signal is no longer received through the transmission path 12AC, the node apparatus 10C couples each of the input channels to all of the output channels other than the output channel having a channel number corresponding thereto. In other words, when the node apparatus 10C detects that no input signal is received during the second supervision time, that the first returning signal is not received even after the second supervision time and that the first sending signal is no longer received, the node apparatus 10C couples each of the input channels to all of the output channels other than the output channel having a channel number corresponding thereto. This means that the communication path is fixed by way of paths excluding the node apparatus 10C or that the communication is not completed and the terminal device 14A has discontinued to send the first sending signal. Accordingly, in all other cases, the arrival of the first returning signal within the terminal response supervision time starting from the detection of the first receiving input channel is guaranteed. When the sending signal does not reach the terminal device 14D for some reason and the terminal device 14A discontinues the transmission of the first sending signal because the first returning signal is not received, the node apparatus 10C couples each of the input channels to all of the output channels other than the output channel having a channel number corresponding thereto.

In the case where both the full duplex communication and the half duplex communication are to be enabled, when the node apparatus 10C detects that the first sending signal is no longer received through the transmission path 12AC and the first returning signal is not received through the transmission path 12CD and the like even after the third supervision time defined by the communication end detection time constant elapses, the node apparatus 10C couples each of the input channels to all of the output channels other than the output channel having a channel number corresponding thereto. In other words, when the node apparatus 10C detects that there are input channels which do not receive the first sending signal and do not receive the first returning signal during the terminal response supervision time which starts from the end of the first sending signal, the node apparatus 10C couples each of these input channels to all of the output channels other than the output channel having the channel number corresponding thereto.

By controlling the coupling of the input and output channels in each of the node apparatuses 10 (10C in this case) not included in the communication path of the sending signal and the returning signal, it is possible to set and fix the communication path between the terminal device 14A and the terminal device 14D. Each of the node apparatuses 10 may carry out the control to set and fix a communication path through the paths which are unused by the communication path which is already fixed and is use.

Therefore, each node apparatus 10 detects the existence or non-existence of the input signal and carries out sequential control during the times defined by the active detection time constant, the input signal detection time constant, the terminal response supervision time and the communication end detection time constant. For example, in the case where the sending terminal device 14 from which the first sending signal originates is authorized to continue and end the full duplex communication, that is, normally when the interval of the sending signal is shorter than the time it takes to detect the end of the signal and the returning signal is transmitted intermittently, the node apparatus 10 detects that a signal is no longer received by the pair of input channels in the fixed communication path or detects that a signal is no longer received by either one of the pair of input channels in the fixed communication path. In this case, the node apparatus 10 couples all of the input channels to all of the output channels other than the output channels having channel numbers corresponding to those of the pair of input channels in the fixed communication path. In this state, the returning signal is not transmitted.

In the case of the half duplex communication and in the case of the full duplex communication where no priority needs to be set for the transmitting station and the receiving station, the node apparatus 10 detects that a signal is no longer received by neither channels of the pair of input channels in the fixed communication path, and couples all of the input channels to all of the output channels other than the output channels having channel numbers corresponding to those of the pair of input channels in the fixed communication path.

Figure 9:
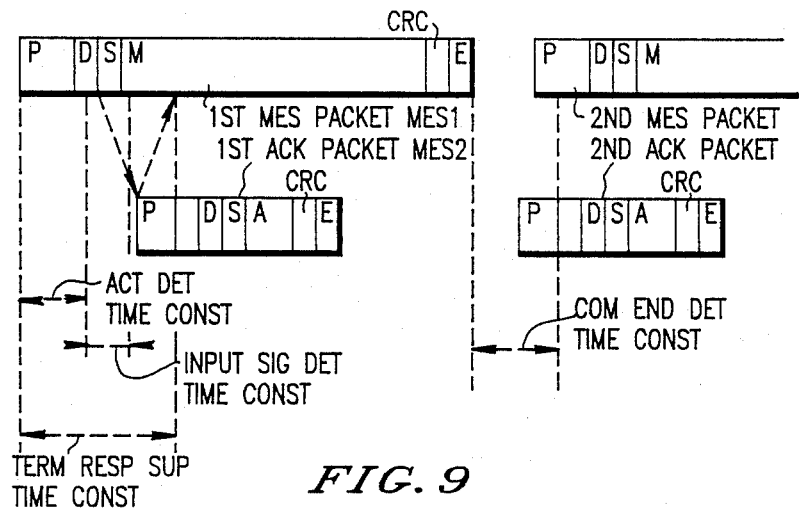
FIG. 9 is a diagram for explaining the flow of message packets when a returning signal (acknowledge packet) is returned normally in response to a sending signal in the full duplex communication.

FIG. 9 is a diagram for explaining the flow of the message packets when the returning signal (acknowledge packet) is returned normally in response to the sending signal in the full duplex communication. As shown in FIG. 9, a message packet MES1 which is transmitted as the first sending signal includes a preamble P and a destination address D before a message M. The preamble P continues for at least a predetermined time so as to enable synchronism with the terminal device 14. There are no other restrictions on the message packet MES1, but normally, the message packet MES1 also includes an origin address S indicating the address of the sending terminal device 14 from which the message packet MES1 originates. A check code area CRC for the cyclic redundancy code (CRC) and the like and a packet end code E follow the message M, and it is possible to provide a postamble (not shown) after the packet end code E for the purpose of maintaining the terminal device 14 is synchronism.

The terminal device 14 transmits the active signal immediately when the first sending signal, that is, the message packet MES1, is first received. When the terminal device 14 discriminates that destination address D of the received message packet MES1 coincides with its own address, the terminal device 14 transmits the first returning signal immediately after this discrimination is made in the case shown in FIG. 9 for the full duplex communication.

Figure 10:
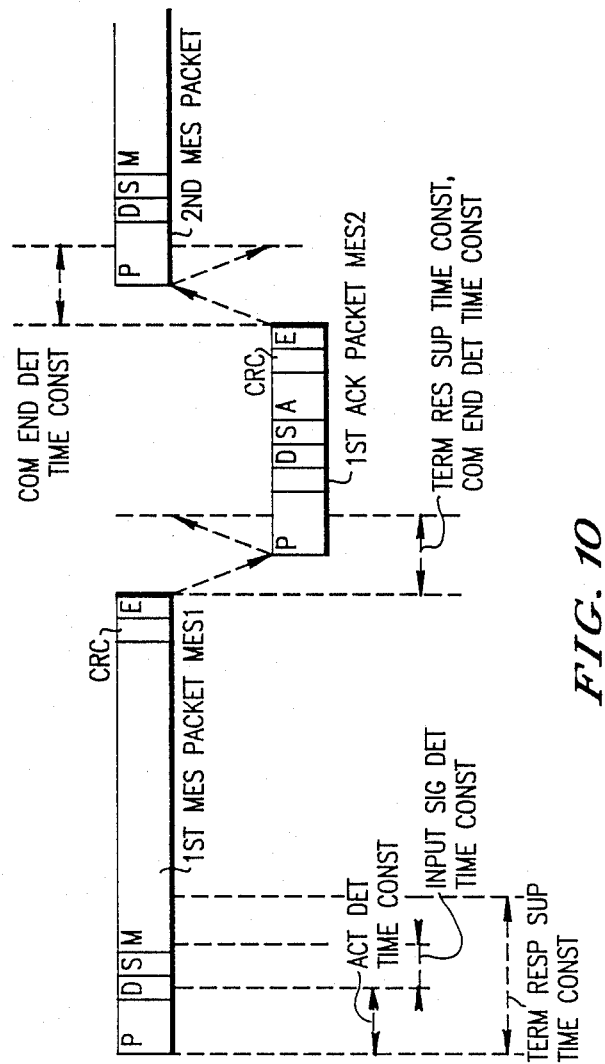
FIG. 10 is a diagram for explaining the flow of message packets when the returning signal (acknowledge packet) is returned normally in response to the sending signal in the half duplex communication.

FIG. 10 is a diagram for explaining the flow of the message packets when the first returning signal (acknowledge packet) is returned normally in response to the first sending signal in the half duplex communication. Hence, when the terminal device 14 discriminates that destination address D of the received message packet MES1 coincides with its own address, the terminal device 14 transmits the first returning signal immediately after the message packet MES1 ends in the case shown in FIG. 10 for the half duplex communication There are no restrictions on an acknowledge packet MES2 which is transmitted as the first returning signal, but normally, the first returning signal has a format similar to the message packet MES1 shown in FIG. 9 or 10. In other words, the first returning signal (acknowledge packet) comprises the preamble P, the destination address D, the origin address S of the destination terminal device 14 which received the first sending signal (message packet MES1), and an acknowledge code A or a not acknowledge code A. The message M may follow the acknowledge or not acknowledge code A. As described before, the transmission of the first returning signal to the sending terminal device 14 from which the first sending signal originates is preferentially guaranteed.

In the case of the full duplex communication, the terminal device 14 may discontinue the transmission when no input signal is received within the first supervision time from the time when the transmission of the first sending signal starts or when an input signal is received within the second supervision time following the first supervision time.

The sending terminal device 14 from which the first sending signal originates supervises the receipt of the first returning signal from the destination terminal device 14 during a terminal response supervision time (fourth predetermined time) having a predetermined length. When the receipt of the first returning signal is detected within the terminal response supervision time, it is discriminated that the destination terminal device 14 can respond normally and that the communication can be continued.

When no input signal is received by the sending terminal device 14 within the first supervision time defined by the active detection time constant from the time when the sending of the first sending signal starts, or when an input signal is received by the sending terminal device 14 within the second supervision time defined by the input signal detection time constant, the communication is discontinued. In the former case, there is a fault in the transmission path 12 or node apparatus 10 which is connected to the sending terminal device 14, and it is necessary to restore the faulty transmission path 12 or node apparatus 10. On the other hand, in the latter case, there is a collision between the sending terminal device 14 and the node apparatus 10 which is connected to the sending terminal device 14, and the sending terminal device 14 must re-transmit the first sending signal.

Figure 11:
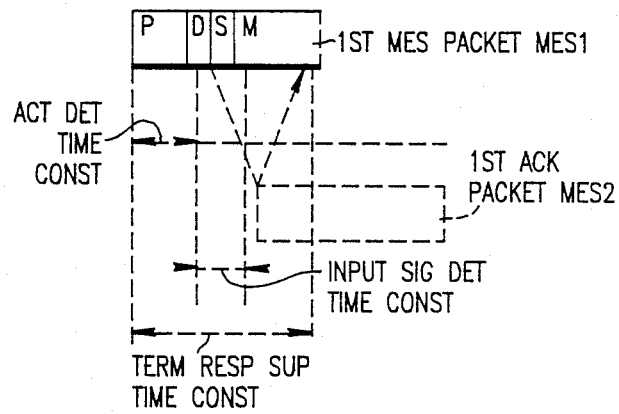
FIG. 11 is a diagram for explaining the flow of message packets when the returning signal (acknowledge packet) is not returned normally in response to the sending signal in the full duplex communication.

When no receipt of the first returning signal from the destination terminal device 14 is detected during the terminal response supervision time, it is discriminated that the first sending signal did not reach the destination terminal device 14 or that the destination terminal device 14 is unable to respond normally, and the communication is discontinued as shown in FIG. 11. FIG. 11 is a diagram for explaining the flow of the message packets when the first returning signal (acknowledge packet) is not returned normally in response to the first sending signal in the full duplex communication. The sending terminal device 14 from which the first sending signal originates may re-transmit the first sending signal, and the control in this case may be similar to that carried out in the communication employing the CSMA method. Accordingly, it is possible to fix a communication path between the sending and destination terminal devices 14, and carry out the communication by the exclusive use of the fixed communication path.

In the case of the full duplex communication, the terminal response supervision time starts from the time when the sending terminal device 14 begins transmission of the first sending signal. The length of the terminal response supervision time is set essentially equal to a sum of the propagation delay time for a return trip covering a maximum tolerable distance between the node apparatus 10 and another node apparatus 10 or the terminal device 14 and the time it takes for the destination terminal device 14 to begin transmission of the first returning signal from the time when the first sending signal is received. Normally, a slight margin time is added to the length of the terminal response supervision time.

In the case where both the full duplex communication and the half duplex communication are to be enabled, the terminal response supervision time starts from the time when the transmission of the first sending signal from the sending terminal device 14 ends. In this case, the length of the terminal response supervision time is set essentially equal to a sum of the propagation delay time for a return trip covering a maximum tolerable distance between the node apparatus 10 and another node apparatus 10 or the terminal device 14 and the time it takes for the destination terminal device 14 to begin transmission of the first returning signal from the time when the receipt of the first sending signal ends. Normally, a slight margin time is also added to the length of this terminal response supervision time. The receipt of an input signal by the node apparatus 10 within the terminal response supervision time is guaranteed.

The destination terminal device 14 may be designed to report the receipt of the first sending signal after the first sending signal is correctly received. In other words, this may be realized by sending the first returning signal immediately after the receipt of the first sending signal ends. The acknowledge or not acknowledge code is included in such first returning signal.

When the terminal device 14 transmits another sending signal or a returning signal in succession to the first sending signal or the first returning signal, that is, when the terminal device 14 transmits a plurality of message packets in succession, the intervals of the message packets should not exceed the third predetermined time defined by the communication end detection time constant described before. In other words, in order to continue the communication by exclusively using the fixed communication path, a message packet should be sent within the third predetermined time after an end of a previous message packet.

In the case of the full duplex communication, a dummy signal such as the postamble is inserted between two successive message packets (for example, between an Nth message packet and a (N+1)th message packet) so that the third predetermined time will not be exceeded. On the other hand, in the case of the half duplex communication, the destination terminal device 14 transmits an Nth returning signal within the third predetermined time after the receipt of an Nth sending signal ends and preferably immediately after the receipt of the Nth sending signal ends, while the sending terminal device 14 from which the Nth sending signal originates sends a (N+1)th sending signal within the third predetermined time after the receipt of the Nth returning signal ends and preferably immediately after the receipt of the Nth returning signal ends. Similarly, even when the data is transmitted in a form other than message packets such as when transmitting audio or video information, the length of the no-signal-state should not exceed the third predetermined time.

The communication can be ended by simply stopping the transmission of the signal from the terminal device 14.

According to the present embodiment, the degree of freedom with respect to the following points is high provided that the detection of the input signal and the control of the coupling of the input and output channels based on this detection are carried out in the five basic steps described before.

Firstly, there is not limit to the maximum and minimum lengths of the message packet, and it is not essential that the data take the form of the message packet.

Secondly, there is no limit to the number of times the sending signal and the returning signal may be repeated, and the fixed communication path may be used exclusively therefor.

Thirdly, it is possible to freely determine the data transmission rate between the sending and destination terminal devices provided that the data transmission rate is less than the maximum data transmission rate determined by the hardware constituting the communication network.

Fourthly, it is possible to freely select either one of the full duplex communication and the half duplex communication, and it is also possible to enable both the full duplex communication and the half duplex communication within the communication network.

In summary, according to the present embodiment, the node apparatus 10 enables a multi-channel communication in which the sending signal and the returning signal can be transferred simultaneously. The faulty node apparatus or line may be avoided when forming the link according to the first-come-first-output logic, thereby maintaining a high data survivability within the lattice communication network.

Furthermore, since the supervising circuit 68 is provided in one or plurality of predetermined node apparatuses 10 in the communication network, the system is forcibly set to the acknowledge sequence when no returning signal from a destination terminal device 14 is received at an input channel of the predetermined node apparatus 10 within the specific time after an input signal is received at another certain input channel of the predetermined node apparatus 10, and this certain input channel is disconnected and separated from all of the output channels of the predetermined node apparatus 10. In addition, an output channel having a channel number corresponding to that of the certain input channel is disconnected and separated from all of the input channels of the predetermined node apparatus 10. The separated input and output channels are restored to the initial state when the input signal ends or when a reset instruction is received. Therefore, it is possible to prevent the unnecessary continuation of the broadcasting of a signal to all of the node apparatuses 10 and terminal devices 14 in the communication network even when an abnormal state such as a broadcasting of a signal to a destination address which does not exist in the communication network and a fault in the terminal device 14 or the node apparatus 10 in the communication network occurs. In other words, it is possible to prevent the entire communication network from being used exclusively for the unnecessary continuation of the broadcasting.

Next, a description will be given on a second embodiment of the communication system employing the multi-conjunction architecture. The general structure of the second embodiment of the communication system is the same as that shown in FIG. 1, and for this reason, illustration and description thereof will be omitted.

Figure 12:
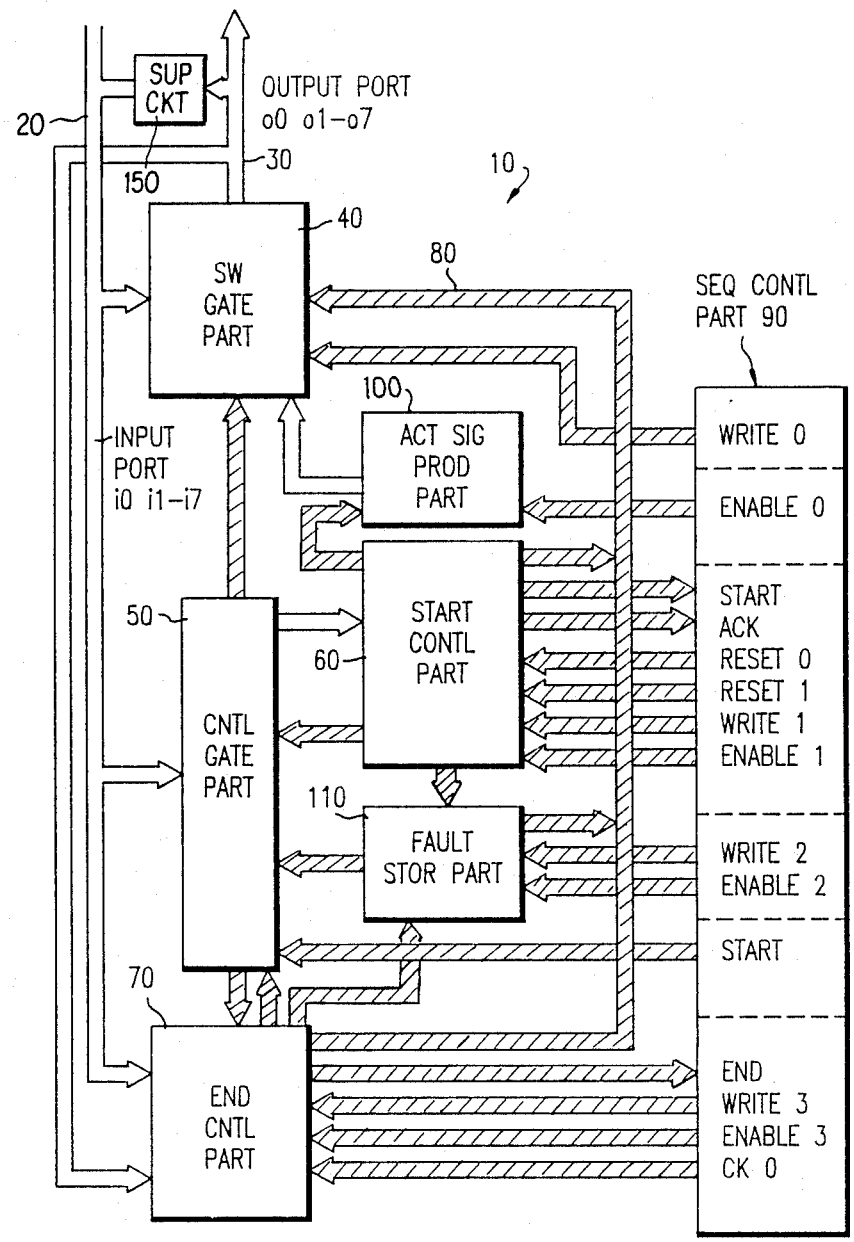
FIG. 12 is a system block diagram showing an embodiment of a node apparatus employed in the second embodiment of the communication system employing the multi-conjunction architecture according to the present invention.

FIG. 12 shows an embodiment of the node apparatus 10 used in the second embodiment. In FIG. 12, those parts which are the same as those corresponding parts in FIG. 2 are designated by the same reference numerals, and a description thereof will be omitted. In the present embodiment, the node apparatus 10 additionally comprises a supervising circuit 150. Furthermore, a start control part 60A does not have the supervising circuit 68 and the lines associated with the supervising circuit 68, but the rest of the start control part 60A is identical to the start control part 60 shown in FIG. 4.

The supervising circuit 150 is coupled between the input port 20 and the output port 30. In the present embodiment, the supervising circuit 150 is connected between a predetermined one of the input channels i0 through i7 of the input port and an output channel of the output port 30 having a corresponding channel number. However, it is possible to provide the supervising circuit 150 between the input port 20 and the output port 30 for all of the channels thereof, or provide the supervising circuit 150 between the input port 20 and the output port 30 for selected channels thereof. In addition, the supervising circuit 150 may be provided within all of the node apparatuses 10 in the communication network or only within one or a plurality of predetermined node apparatuses 10.

When the supervising circuit 150 is connected to a certain input channel and no returning signal is received from a destination terminal device 14 within a specific time after an input signal is received at the certain input channel, the supervising circuit 150 generates a pseudo returning signal. This pseudo returning signal is supplied to the certain input channel so as to set a link in the communication network. In other words, when the input signal is first received by the certain input channel out of the input channels i0 through i7, the switching gate part 40 connects this certain input channel to all of the output channels o0 through o7 except the output channel having a channel number corresponding to that of the certain input channel. The supervising circuit 150 supervises the sending signal outputted from the output channel which is connected to the supervising circuit 150, and supplies the pseudo returning signal to the input channel which is connected to the supervising circuit 150 when the sending signal is continuously outputted from the output channel for the specific time. The specific time will be defined later.

The node apparatus 10 treats the pseudo returning signal from the supervising circuit 150 as if it were the returning signal from the destination terminal device 14, and carries out the normal operation of setting the link in the appropriate channels. Accordingly, it is possible to prevent the unnecessary continuation of the broadcasting of a signal to all of the node apparatuses 10 and terminal devices 14 in the communication network even when an abnormal state such as a broadcasting of a signal to a destination address which does not exist in the communication network and a fault in the terminal device 14 or the node apparatus 10 in the communication network occurs. In other words, it is possible to prevent the entire communication network from being used exclusively for the unnecessary continuation of the broadcasting.

The specific time is a time period in which the receipt of a first returning signal from the destination terminal device 14 is guaranteed. In the case of the full duplex communication, the specific time starts from a time when the input channel which first receives the first sending signal is detected. The specific time is set to a time which is essentially equal to a sum of a propagation delay time for a return trip covering a maximum tolerable distance between the node apparatus 10 and another node apparatus 10 or the terminal device 14 and a time it takes for the receiving terminal device 14 to start sending the first returning signal after receipt of the first sending signal. In the case where both the full duplex communication and the half duplex communication are to be included, the specific time starts from the end of the first sending signal. In this case, the specific time is set to a time which is essentially equal to a sum of a propagation delay time for a return trip covering a maximum tolerable distance between the node apparatus 10 and another node apparatus 10 or the terminal device 14 and a time it takes for the receiving terminal device 14 to start sending the first returning signal after the receipt of the first sending signal ends. Normally, a slight margin time is added to the length of the specific time.

Figure 13:
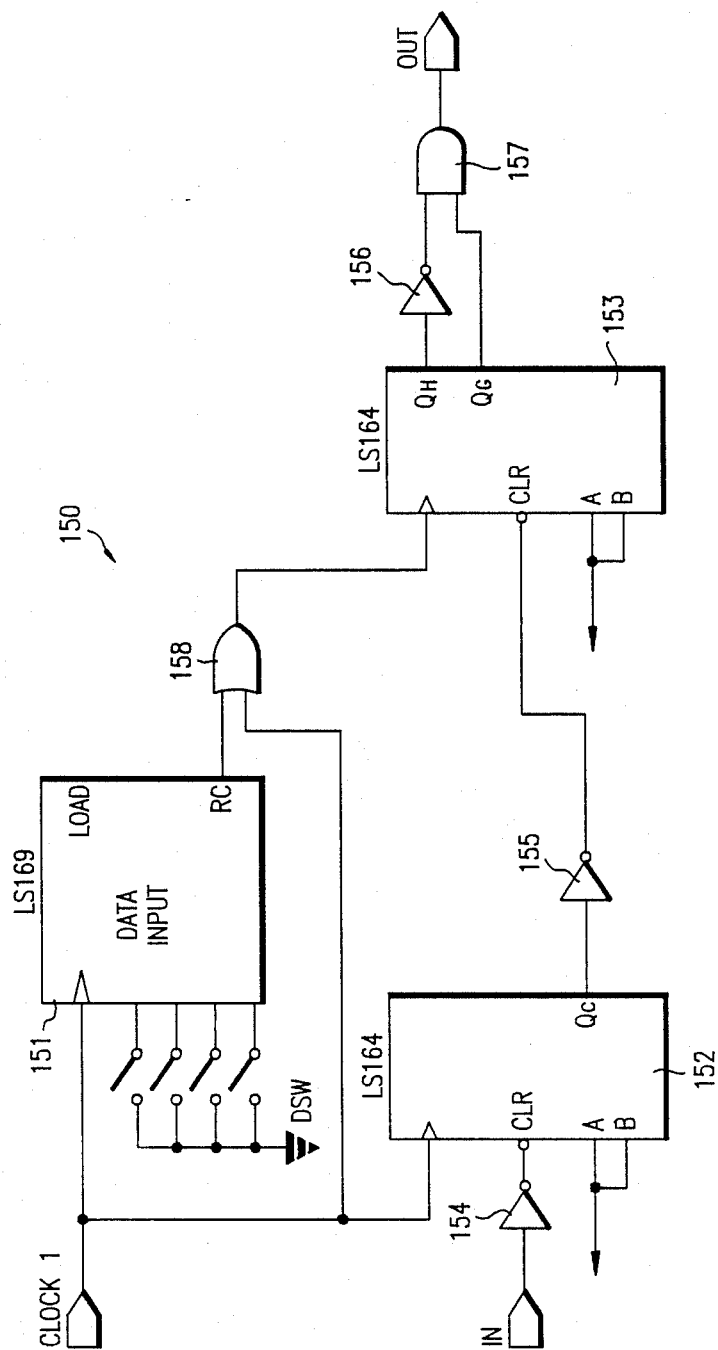
FIG. 13 is a circuit diagram showing a first embodiment of a supervising circuit of the node apparatus shown in FIG. 12.

FIG. 13 shows a first embodiment of the supervising circuit 150 of the node apparatus shown in FIG. 12. In FIG. 12, the supervising circuit 150 comprises a time constant setting circuit 151 for setting a time constant for generating the pseudo returning signal, a detecting circuit 152 for detecting the state of the output port 30, a timer circuit 153 for supervising the continuation of a specific state of the output port 30, inverters 154 through 156, an AND gate 157, an OR gate 158 and a data set switch DSW which are connected as shown.

In the present embodiment, the signal level at the output channel of the output port 30 is low in the initial state. The detecting circuit 152 distinguishes the low level in the initial state and the low level included in the output signal. In the present embodiment, the detecting circuit 152 detects the initial state when the low level at the output channel continues for a time amounting to three pulses of the clock signal CLOCK1. A $Q_C$-output of the detecting circuit 152 is supplied to a clear terminal CLR of the timer circuit 153 through the inverter 155.

When a high-level signal from the output channel is supplied to a clear terminal CLR of the detecting circuit 152 through the inverter 154, the timer circuit 153 starts to count the pulses of the clock signal CLOCK1 responsive thereto. In the present embodiment, when the signal from the output channel continues to have the high level while the timer circuit 153 counts seven pulses of the clock signal CLOCK1, the timer circuit 153 sets a $Q_G$-output and a $Q_H$-output thereof to a high level. The $Q_G$-output of the timer circuit 153 is supplied directly to the AND gate 157 while the $Q_H$-output of the timer circuit 153 is supplied to the AND gate 157 through the inverter 156. An output signal of the AND gate 157 is supplied as the pseudo returning signal to the input channel which is connected to the supervising circuit 150.

Accordingly, when a signal is obtained from the output channel for the specific time, a single pulse is outputted from the AND gate 157 as the pseudo returning signal. The node apparatus 10 sets the link responsive to this pseudo returning signal, and releases the set link when the first sending signal ceases.

The time constant of the timer circuit 153 is set by the data set switch DSW which is coupled to the time constant setting circuit 151. By setting the time constant for the generation of the pseudo returning signal to different values among the channels, it is possible to assign priorities to the channels or the node apparatuses 10. In other words, an input channel having the shorter time constant will receive the pseudo returning signal before the other input channels, and such an input channel will be treated as the first receiving input channel which receives the returning signal first.

In the first embodiment of the supervising circuit 150 shown in FIG. 13, a signal such as a single pulse is generated discontinuously as the pseudo returning signal. However, it is also possible to generate a signal continuously as the pseudo returning signal.

Figure 14:
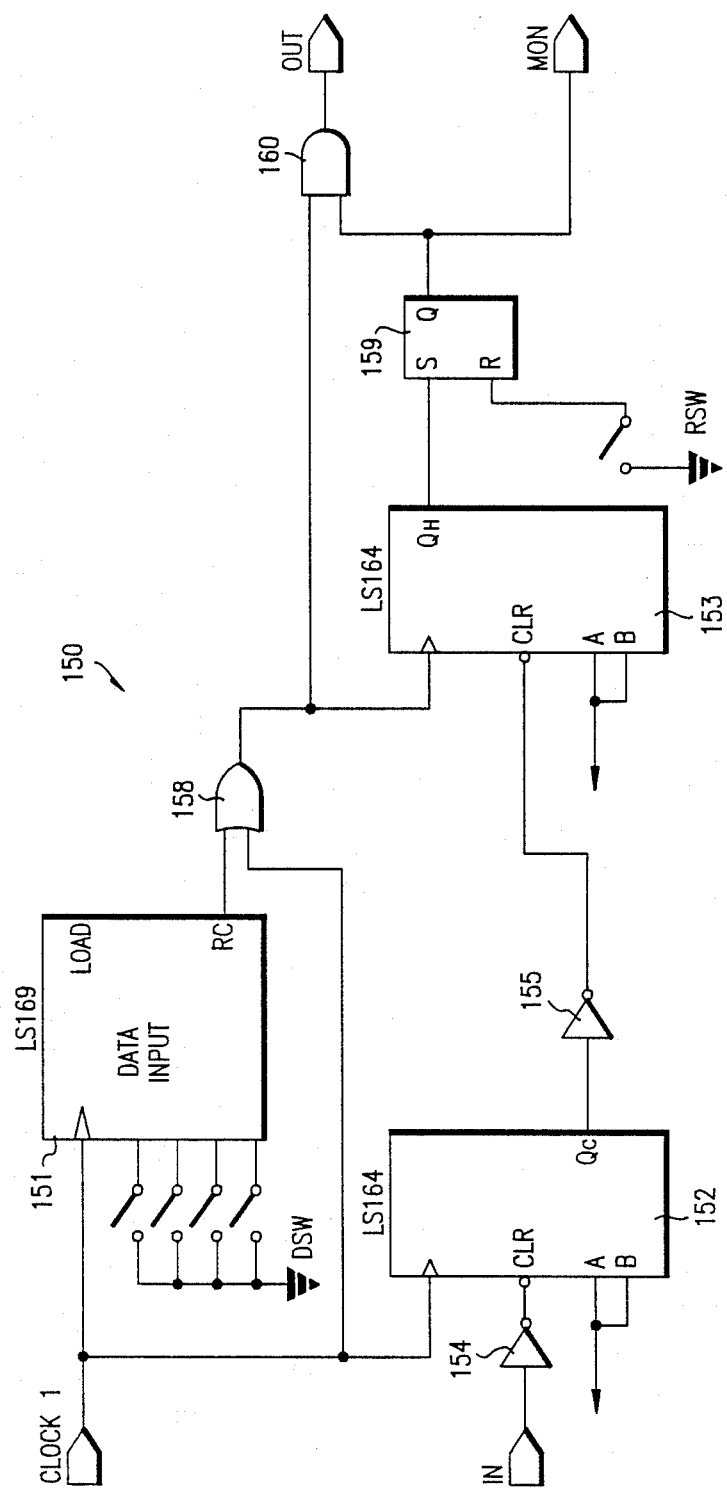
FIG. 14 is a circuit diagram showing a second embodiment of the supervising circuit of the node apparatus shown in FIG. 12.

FIG. 14 shows a second embodiment of the supervising circuit 150 which generates a signal continuously as the pseudo returning signal. In FIG. 14, those parts which are the same as those corresponding parts in FIG. 13 are designated by the same reference numerals, and a description thereof will be omitted. The supervising circuit 150 shown in FIG. 14 uses in place of the inverter 156 and the AND gate 157 an SR flip-flop 159, an AND gate 160 and a reset switch RSW which are connected as shown.

The $Q_H$-output of the timer circuit 153 is supplied to a set terminal S of the flip-flop 159, and a reset terminal R of the flip-flop 159 is grounded when the reset switch RSW is closed. A Q-output of the flip-flop 159 is supplied to the AND gate 160 which also receives an output signal of the OR gate 158. An output signal of the AND gate 160 is supplied as the pseudo returning signal to the input channel which is connected to the supervising circuit 150.

The pseudo returning signal is continuously supplied to the input channel which is connected to the supervising circuit 150. The continuing duration of the pseudo returning signal may be substantially the same as the communication end detection time constant described before.

The pseudo returning signal from the AND gate 160 is also outputted as a maintenance information MON for monitoring. For example, this maintenance information MON is used to display that an abnormal state such as a failure in the communication network, unnecessary continuation of the broadcasting and non-releasable set link has occurred, and the link is set responsive to the pseudo returning signal. The maintenance information MON may be transmitted outside the communication network for analyzing the set link in the communication network and for the maintenance of the communication network.

In the first embodiment of the supervising circuit 150, the link which is set responsive to the pseudo returning signal is released when the sending signal ceases. However, in the second embodiment of the supervising circuit 150, the link which is set responsive to the pseudo returning signal is maintained and will not be released even when the sending signal ceases. The set link is released only when the reset instruction is given by opening the reset switch RSW to reset the flip-flop 159.

Figure 15:
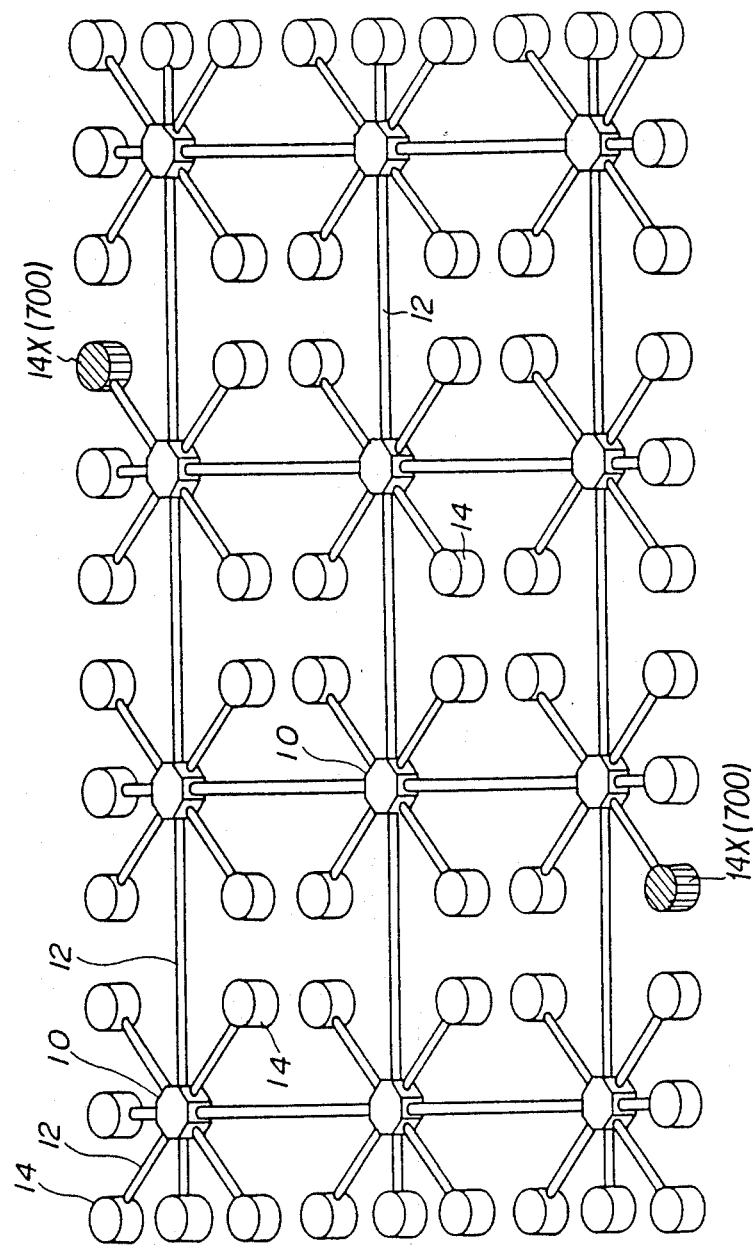
FIG. 15 shows third and fourth embodiments of the communication system employing the multi-conjunction architecture according to the present invention.

Next, a description will be given on a third embodiment of the communication system employing the multi-conjunction architecture, by referring to FIG. 15. In FIG. 15, those parts which are the same as those corresponding parts in FIG. 1 are designated by the same reference numerals, and a description thereof will be omitted.

In the third embodiment of the communication system employing the multi-conjunction architecture, one or a plurality of predetermined terminal devices 14X are provided with the supervising circuit 150. In other words, the supervising circuit 150 is provided in the one or plurality of predetermined terminal devices 14X instead of being provided in the one or plurality of predetermined node apparatuses 10 as in the case of the second embodiment of the communication system. In FIG. 15, there are two such predetermined terminal devices 14X provided in the communication network.

FIG. 16 shows an embodiment of an essential part of the predetermined terminal device 14X which is provided with the supervising circuit 150. The supervising circuit 150 receives the sending signal from a receiving line in the transmission path 12 connected to a certain node apparatus 10 through a line receiver 600 within a network interface unit 603 of the predetermined terminal device 14X. On the other hand, the pseudo returning signal outputted from the supervising circuit 150 is passed through an OR gate 602 and a line driver 601 within the network interface unit 603 and is supplied to a sending line in the transmission path 12 connected to the certain node apparatus 10. The illustration and description of other parts of the predetermined terminal device 14X will be omitted.

The supervising circuit 150 within the predetermined terminal device 14X may have the construction shown in FIG. 13 or 14 described before. By using the first embodiment of the supervising circuit 150 shown in FIG. 13, the link which is set responsive to the pseudo returning signal is released when the sending signal ceases. On the other hand, by using the second embodiment of the supervising circuit 150 shown in FIG. 14, the link which is set responsive to the pseudo returning signal is maintained and will not be released even when the sending signal ceases, and the set link is released only when the reset instruction is given by opening the reset switch RSW to reset the flip-flop 159.

Next, a description will be given on a fourth embodiment of the communication system employing the multi-conjunction architecture, by referring again to FIG. 15. In the fourth embodiment of the communication system employing the multi-conjunction architecture, one or a plurality of supervising devices 700 are provided in place of the terminal device 14. The supervising device 700 comprises the supervising circuit 150. In other words, the supervising circuit 150 is provided in the one or plurality of supervising devices 700 instead of being provided in one or plurality of predetermined node apparatuses 10 as in the case of the second embodiment of the communication system. In FIG. 15, there are two supervising devices 700 in the communication network as indicated in brackets.

FIG. 17 shows an embodiment of the supervising device 700 which is provided with the supervising circuit 150. The supervising circuit 150 receives the sending signal from a receiving line in the transmission path 12 connected to a certain node apparatus 10 through a line receiver 701. On the other hand, the pseudo returning signal outputted from the supervising circuit 150 is passed through a line driver 702 and is supplied to a sending line in the transmission path 12 connected to the certain node apparatus 10.

The supervising circuit 150 within the supervising device 700 may have the construction shown in FIG. 13 or 14 described before. By using the first embodiment of the supervising circuit 150 shown in FIG. 13, the link which is set responsive to the pseudo returning signal is released when the sending signal ceases. On the other hand, by using the second embodiment of the supervising circuit 150 shown in FIG. 14, the link which is set responsive to the pseudo returning signal is maintained and will not be released even when the sending signal ceases, and the set link is released only when the reset instruction is given by opening the reset switch RSW to reset the flip-flop 159.

According to the second through fourth embodiments of the communication system, the node apparatus 10 treats the pseudo returning signal from the supervising circuit 150 as if it were the returning signal from the destination terminal device 14, and carries out the normal operation of setting the link in the appropriate channels. Accordingly, it is possible to prevent the unnecessary continuation of the broadcasting of a signal to all of the node apparatuses 10 and terminal devices 14 in the communication network even when an abnormal state such as a broadcasting of a signal to a destination address which does not exist in the communication network and a fault in the terminal device 14 or the node apparatus 10 in the communication network occurs. In other words, it is possible to prevent the entire communication network from being used exclusively for the unnecessary continuation of the broadcasting.

Further, the present invention is not limited to these embodiments, but various variations and modifications may be made without departing from the scope of the present invention.

What is claimed is:

1. A communication system employing a multi-conjunction architecture comprising:
a plurality of node apparatuses;
a plurality of terminal devices including a destination terminal device which is to receive a sending signal; and
a plurality of transmission paths each coupling one node apparatus to another node apparatus or one terminal device,
each of said node apparatuses comprising an input port having a plurality of input channels connected to the transmission paths, an output port having a plurality of output channels connected to the transmission paths, a switching gate part for coupling the input and output channels of the input and output ports, and control means for controlling said switching gate part to selectively couple said input and output channels, said control means controlling said switching gate part to maintain said input and output channels coupled to each other in an initial state so that each input channel other than input channel included in a fixed communication path is coupled to all of said output channels other than an output channel having a corresponding channel number,
said control means comprising first input detecting means coupled to said input port for detecting a first receiving input channel which receives a signal first out of said plurality of input channels, and input signal detecting means for detecting whether or not said input channels receive a signal from the transmission paths,
said control means controlling said switching gate part responsive to the detection of said first receiving input channel in said first input detecting means so that all of said input channels other than said first receiving input channel are disconnected from said output channels, thereby transferring the sending signal received by said first receiving input channel to all of said output channels other than an output channel having a channel number corresponding to that of said first receiving input channel,
said input signal detecting means supervising whether or not a signal is received by predetermined input channels having channel numbers corresponding to those of the output channels which transfer the sending signal received by said first receiving input channel, so as to detect specific ones of said predetermined input channels which receive no signal and to detect a certain one of said predetermined input channels which receives a signal, said control means controlling said switching gate part responsive to the detection of said certain input channel in said input signal detecting means so that said certain input channel is coupled to the output channel having the channel number corresponding to that of said first receiving input channel and said first receiving input channel is coupled to an output channel having a channel number corresponding to that of said certain input channel, thereby a communication path being fixed between said input and output ports, each of said input channels other than said first receiving input channel and said certain input channel being coupled to all of said output channels other than output channels having channel numbers corresponding to those of said first receiving input channel, said certain input channel, and the output channel having a channel number corresponding to its input channel, said input signal detecting means of at least a predetermined one of said node apparatuses comprising supervising means for supervising said input port, said supervising means controlling said switching gate part to disconnect a given input channel from all of said output channels when said given input channel continues to receive the sending signal received by said first receiving input channel for a time exceeding a specific time.

2. A communication system employing a multi-conjunction architecture as claimed in claim 1 in which said supervising means releases the disconnection of said given input channel from said output channels to restore said given input channel to the initial state when the sending signal received by said given input channel ceases.

3. A communication system employing a multi-conjunction architecture as claimed in claim 1 in which said supervising means releases the disconnection of said given input channel from said output channels to restore said given input channel to the initial state when said supervising means receives an external reset instruction.

4. A communication system employing a multi-conjunction architecture as claimed in claim 1 in which said supervising means controls said switching gate part to disconnect said given input channel from all of said output channels when said given input channel continues to receive the sending signal received by said first receiving input channel for a time exceeding said specific time from a time when said first receiving input channel is detected in said first input detecting means, said specific time being set to a time which is essentially equal to a sum of a propagation delay time for a return trip covering a maximum tolerable distance between said predetermined node apparatus and another node apparatus or terminal device and a time it takes for the destination terminal device to start sending a return signal after receipt of the sending signal.

5. A communication system employing a multi-conjunction architecture as claimed in claim 1 in which said supervising means controls said switching gate part to disconnect said given input channel from all of said output channels when said given input channel continues to receive the sending signal received by said first receiving input channel for a time exceeding said specific time from a time when the sending signal received by said first receiving input channel ends, said specific time being set to a time which is essentially equal to a sum of a propagation delay time for a return trip covering a maximum tolerable distance between said predetermined node apparatus and another node apparatus or terminal device and a time it takes for the destination terminal device to start sending a return signal after receipt of the sending signal ends.

6. A communication system employing a multi-conjunction architecture comprising:

a plurality of node apparatuses;

one or a plurality of terminal devices including a destination terminal device which is to receive a sending signal;

a plurality of transmission paths each coupling one node apparatus to another node apparatus or one terminal device; and supervising means, each of said node apparatuses comprising an input port having a plurality of input channels connected to the transmission paths, an output port having a plurality of output channels connected to the transmission paths, a switching gate part for coupling the input and output channels of the input and output ports, and control means for controlling said switching gate part to selectively couple said input and output channels, said control means comprising first input detecting means coupled to said input port for detecting a first receiving input channel which receives a signal first out of said input channels, and input signal detecting means for detecting whether or not said input channels receive a signal from the transmission paths, said control means controlling said switching gate part to maintain said input and output channels coupled to each other in an initial state so that each input channel other than input channels included in a fixed communication path is coupled to all of said output channels other than an output channel having a corresponding channel number, and the output channels included in a fixed communication path said control means controlling said switching gate part responsive to the detection of said first receiving input channel in said first input detecting means so that all of said input channels other than said first receiving input channel are disconnected from said output channels, thereby transferring the sending signal received by said first receiving input channel to all of said output channels other than an output channel having a channel number corresponding to that of said first receiving input channel, said input signal detecting means supervising whether or not a signal is received by predetermined input channels having channel numbers corresponding to those of the output channels which transfer the signal received by said first receiving input channel, so as to detect specific ones of said predetermined input channels which receive no signal and to detect a certain one of said predetermined input channels which receives a signal, said control means controlling said switching gate part responsive to the detection of said certain input channel in said input signal detecting means so that said certain input channel is coupled to the output channel having the channel number corresponding to that of said first receiving input channel and said first receiving input channel is coupled to an output channel having a channel number corresponding to that of said certain input channel, thereby a communication path being fixed between said input and output ports, each of said input channels other than said first receiving input channel and said certain input channel being coupled to all of said output channels other than output channel having channel numbers corresponding to those of said first receiving input channel and said certain input channel, and output channel having a channel number corresponding to its input channel, said supervising means supervising said output port of at least a predetermined one of said node apparatuses and outputting a pseudo return signal to be received by said predetermined node apparatus as a return signal from the destination terminal device when a given output channel continues to output the sending signal received by said first receiving input channel for a time exceeding a specific time.

7. A communication system employing a multi-conjunction architecture as claimed in claim 6 in which said supervising means is provided within said predetermined node apparatus, said supervising means having an input terminal connected to at least one of said output channels of said output port and having an output terminal for outputting said pseudo returning signal connected to at least one of said input channels of said input port.

8. A communication system employing a multi-conjunction architecture as claimed in claim 7 in which said supervising means stops outputting said pseudo returning signal when the sending signal received by said first receiving input channel ends.

9. A communication system employing a multi-conjunction architecture as claimed in claim 7 in which said supervising means stops outputting said pseudo returning signal when said supervising means receives an external reset instruction.

10. A communication system employing a multi-conjunction architecture as claimed in claim 7 in which said supervising means outputs said pseudo returning signal when said given output channel continues to output the sending signal received by said first receiving input channel for a time exceeding said specific time from a time when said first receiving input channel is detected in said first input detecting means, said specific time being set to a time which is essentially equal to a sum of a propagation delay time for a return trip covering a maximum tolerable distance between said predetermined node apparatus and another node apparatus or terminal device and a time it takes for the destination terminal device to start sending a return signal after receipt of the sending signal.

11. A communication system employing a multi-conjunction architecture as claimed in claim 7 in which said supervising means outputs said pseudo returning signal when said given output channel continues to output the sending signal received by said first receiving input channel for a time exceeding said specific time from a time when said first receiving input channel is detected in said first input detecting means, said specific time being set to a time which is essentially equal to a sum of a propagation delay time for a return trip covering a maximum tolerable distance between said predetermined node apparatus and another node apparatus or terminal device and a time it takes for the destination terminal device to start sending a return signal after receipt of the sending signal ends.

12. A communication system employing a multi-conjunction architecture as claimed in claim 6 in which said supervising means is provided within at least a predetermined one of said terminal devices, said supervising means having an input terminal connected to at least a receiving line in the transmission path which is coupled to said given output channel of the output port of said predetermined node apparatus and having an output terminal for outputting said pseudo returning signal connected to at least a sending line in the transmission path which is coupled to said predetermined node apparatus.

13. A communication system employing a multi-conjunction architecture as claimed in claim 12 in which said supervising means stops outputting said pseudo returning signal when the sending signal received by said first receiving input channel ends.

14. A communication system employing a multi-conjunction architecture as claim in claim 12 in which said supervising means stops outputting said pseudo returning signal when said supervising means receives an external reset instruction.

15. A communication system employing a multi-conjunction architecture as claimed in claim 12 in which said supervising means outputs said pseudo returning signal when said given output channel continues to output the sending signal received by said first receiving input channel for a time exceeding said specific time from a time when said first receiving input channel is detected in said first input detecting means, said specific time being set to a time which is essentially equal to a sum of a propagation delay time for a return trip covering a maximum tolerable distance between said predetermined node apparatus and another node apparatus or terminal device and a time it takes for the destination terminal device to start sending a return signal after receipt of the sending signal.

16. A communication system employing a multi-conjunction architecture as claimed in claim 12 in which said supervising means outputs said pseudo returning signal when said given output channel continues to output the sending signal received by said first receiving input channel for a time exceeding said specific time from a time when said first receiving input channel is detected in said first input detecting means, said specific time being set to a time which is essentially equal to a sum of a propagation delay time for a return trip covering a maximum tolerable distance between said predetermined node apparatus and another node apparatus or terminal device and a time it takes for destination terminal device to start sending a return signal after receipt of the sending signal ends.

17. A communication system employing a multi-conjunction architecture as claimed in claim 6 in which said supervising means is provided in place of at least a predetermined one of said terminal devices, said supervising means having an input terminal connected to at least a receiving line in the transmission path which is coupled to said given output channel of the output port of said predetermined node apparatus and having an output terminal for outputting said pseudo returning signal connected to at least a sending line in the transmission path which is coupled to said predetermined node apparatus.

18. A communication system employing a multi-conjunction architecture as claimed in claim 17 in which said supervising means stops outputting said pseudo returning signal when the sending signal received by said first receiving input channel ends.

19. A communication system employing a multi-conjunction architecture as claimed in claim 17 in which said supervising means stops outputting said pseudo returning signal when said supervising means receives an external reset instruction.

20. A communication system employing a multi-conjunction architecture as claimed in claim 17 in which said supervising means outputs said pseudo returning signal when said given output channel continues to output the sending signal received by said first receiving input channel for a time exceeding said specific time from a time when said first receiving input channel is detected in said first input detecting means, said specific time being set to a time which is essentially equal to a sum of a propagation delay time for a return trip covering a maximum tolerable distance between said predetermined node apparatus and another node apparatus or terminal device and a time it takes for the destination terminal device to start sending a return signal after receipt of the sending signal.

21. A communication system employing a multi-conjunction architecture as claimed in claim 17 in which said supervising means outputs said pseudo returning signal when said given output channel continues to output the sending signal received by said first receiving input channel for a time exceeding said specific time from a time when said first receiving input channel is detected in said first input detecting means, said specific time being set to a time which is essentially equal to a sum of a propagation delay time for a return trip covering a maximum tolerable distance between said predetermined node apparatus and another node apparatus or terminal device and a time it takes for the destination terminal device to start sending a return signal after receipt of the sending signal ends.

22. A communication system employing a multi-conjunction architecture as claimed in claim 6 in which said supervising means outputs said pseudo returning signal continuously.

23. A communication system employing a multi-conjunction architecture as claimed in claim 6 in which said supervising means outputs said pseudo returning signal discontinuously.

* * * * *